US011365328B2

(12) United States Patent
Seabaugh et al.

(10) Patent No.: US 11,365,328 B2
(45) Date of Patent: Jun. 21, 2022

(54) AIR AND WATER BARRIER ARTICLE INCLUDING INELASTIC POROUS LAYER

(71) Applicant: 3M INNOVATIVE PROPERTIES COMPANY, St. Paul, MN (US)

(72) Inventors: Taylor M. Seabaugh, Palo Alto, CA (US); Martin J. O. Widenbrant, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/488,119

(22) PCT Filed: Feb. 21, 2018

(86) PCT No.: PCT/US2018/019022
§ 371 (c)(1),
(2) Date: Aug. 22, 2019

(87) PCT Pub. No.: WO2018/156631
PCT Pub. Date: Aug. 30, 2018

(65) Prior Publication Data
US 2019/0382622 A1 Dec. 19, 2019

Related U.S. Application Data

(60) Provisional application No. 62/462,707, filed on Feb. 23, 2017.

(51) Int. Cl.
| E04B 1/62 | (2006.01) |
| C09J 7/29 | (2018.01) |
| C09J 7/40 | (2018.01) |
| C09J 7/38 | (2018.01) |
| C09J 5/00 | (2006.01) |

(52) U.S. Cl.
CPC . *C09J 7/29* (2018.01); *C09J 5/00* (2013.01); *C09J 7/38* (2018.01); *C09J 7/405* (2018.01); *E04B 1/625* (2013.01); *C09J 2400/263* (2013.01); *C09J 2401/006* (2013.01); *C09J 2423/006* (2013.01); *C09J 2467/006* (2013.01); *C09J 2471/006* (2013.01); *C09J 2477/006* (2013.01)

(58) Field of Classification Search
None
See application file for complete search history.

(56) References Cited

U.S. PATENT DOCUMENTS

| RE24,906 E | 12/1960 | Ulrich |
| 3,039,893 A | 6/1962 | Banigan, Jr. |
| 3,169,899 A | 2/1965 | Steuber |
| 3,426,754 A | 2/1969 | Bierenbaum |
| 3,532,589 A | 10/1970 | David |
| 3,592,795 A | 7/1971 | Ashby |
| 3,627,722 A | 12/1971 | Seiter |
| 3,632,557 A | 1/1972 | Brode |
| 3,711,445 A | 1/1973 | Chu |
| 3,831,342 A | 8/1974 | Rejsa |
| 3,900,102 A | 8/1975 | Hurst |
| 3,937,640 A | 2/1976 | Tajima |
| 4,067,844 A | 1/1978 | Barron |
| 4,153,594 A | 5/1979 | Wilson, Jr. |
| 4,201,808 A | 5/1980 | Cully |
| 4,329,384 A | 5/1982 | Vesley |
| 4,330,590 A | 5/1982 | Vesley |
| 4,345,053 A | 8/1982 | Rizk |
| 4,366,307 A | 12/1982 | Singh |
| 4,374,237 A | 2/1983 | Berger |
| 4,379,201 A | 5/1983 | Heilmann |
| 4,543,403 A | 9/1985 | Isayama |
| 4,576,999 A | 3/1986 | Eckberg |
| 4,593,068 A | 6/1986 | Hirose |
| 4,618,653 A | 10/1986 | Kawakubo |
| 4,618,656 A | 10/1986 | Kawakubo |

(Continued)

FOREIGN PATENT DOCUMENTS

| CA | 2939923 A1 * | 8/2015 | ............. E04B 1/625 |
| CN | 1869375 | 11/2006 | |

(Continued)

OTHER PUBLICATIONS

Mukhopadhyay, "A Review on Designing the Waterproof Breathable Fabrics Part I: Fundamental Principles and Designing Aspects of Breathable Fabrics", 2008, Journal of Industrial Textiles, vol. 37, No. 3, pp. 225-262.

(Continued)

*Primary Examiner* — Anish P Desai
(74) *Attorney, Agent, or Firm* — Kathleen B. Gross

(57) ABSTRACT

The air and water barrier article includes a polymer-coated inelastic porous layer including a water-vapor permeable polymeric coating disposed on at least one major surface of the inelastic porous layer and an adhesive disposed on a major surface of the polymer-coated inelastic porous layer. The inelastic porous layer can include at least one of surface-modified fibers or natural cellulose fibers. The polymer-coated inelastic porous layer can at least one of a water strike through time of not more than 180 seconds or an absorbance capacity of at least one-half gram per 116 square centimeters. The adhesive may be exposed, in contact with a release surface, or adhered to a surface of a building component. A method of applying the air and water barrier article to a surface of a building component is also disclosed.

20 Claims, 2 Drawing Sheets

(56) References Cited

U.S. PATENT DOCUMENTS

| | | |
|---|---|---|
| 4,645,816 A | 2/1987 | Pohl |
| 4,654,417 A | 3/1987 | Inoue |
| 4,687,818 A | 8/1987 | Kawakubo |
| 4,737,559 A | 4/1988 | Kellen |
| 4,751,122 A | 6/1988 | May |
| 4,774,356 A | 9/1988 | Inoue |
| 4,822,451 A | 4/1989 | Ouderkirk |
| 4,900,772 A | 2/1990 | Imanaka |
| 4,904,732 A | 2/1990 | Iwahara |
| 4,904,745 A | 2/1990 | Inoue |
| 4,923,650 A | 5/1990 | Antoon |
| 4,960,844 A | 10/1990 | Singh |
| 4,984,584 A | 1/1991 | Hansen |
| 5,068,304 A | 11/1991 | Higuchi |
| 5,073,611 A | 12/1991 | Rehmer |
| 5,120,594 A | 6/1992 | Mrozinski |
| 5,198,064 A | 3/1993 | Tani |
| 5,223,583 A | 6/1993 | Higuchi |
| 5,316,848 A | 5/1994 | Bartlett |
| 5,317,035 A | 5/1994 | Jacoby |
| 5,348,791 A | 9/1994 | Thompson |
| 5,364,955 A | 11/1994 | Zwiener |
| 5,374,477 A | 12/1994 | Lawless |
| 5,593,771 A | 1/1997 | Lawless |
| 5,756,751 A | 5/1998 | Schmalstieg |
| 5,811,566 A | 9/1998 | Watabe |
| 5,882,573 A | 3/1999 | Kwok |
| 5,895,301 A | 4/1999 | Porter |
| 5,972,147 A | 10/1999 | Janis |
| 5,986,014 A | 11/1999 | Kusakabe |
| 5,990,257 A | 11/1999 | Johnston |
| 6,001,946 A | 12/1999 | Waldman |
| 6,046,270 A | 4/2000 | Roesler |
| 6,176,961 B1 | 1/2001 | Mossbeck et al. |
| 6,197,912 B1 | 3/2001 | Huang |
| 6,235,365 B1 | 5/2001 | Schaughency |
| 6,361,634 B1 | 3/2002 | White |
| 6,495,229 B1 | 12/2002 | Carte |
| 6,534,129 B1 | 3/2003 | Miller et al. |
| 6,602,809 B1 | 8/2003 | Cabrey |
| 6,645,887 B2 | 11/2003 | Kocinec et al. |
| 6,706,225 B2 | 3/2004 | Cabrey |
| 6,901,712 B2 | 6/2005 | Borenstein |
| 6,904,649 B2 | 6/2005 | VanBenschoten |
| 7,060,750 B2 | 6/2006 | Jansen |
| 7,094,859 B2 | 8/2006 | Schindler |
| 7,153,923 B2 | 12/2006 | Schindler |
| 7,351,296 B2 | 4/2008 | Waggoner |
| 7,682,675 B2 | 3/2010 | Boge |
| 7,718,250 B2 | 5/2010 | Sieber |
| 7,829,488 B2 | 11/2010 | Bennett |
| 7,833,916 B2 | 11/2010 | Leeser |
| 7,846,504 B2 | 12/2010 | Maier |
| 7,867,591 B2 | 1/2011 | Sieber |
| 8,001,736 B2 | 8/2011 | Goldberg |
| 8,061,098 B2 | 11/2011 | Whelan |
| 8,215,083 B2 | 7/2012 | Toas |
| 8,277,915 B2 | 10/2012 | Couturier |
| 8,334,227 B2 | 12/2012 | Tee |
| 8,399,088 B2 | 3/2013 | Deng |
| 8,535,786 B2 | 9/2013 | Schroer |
| 8,551,594 B2 | 10/2013 | Deiss |
| 8,609,213 B2 | 12/2013 | Wiercinski et al. |
| 8,613,181 B2 | 12/2013 | Jay |
| 8,826,611 B2 | 9/2014 | Veilleux |
| 8,883,284 B2 | 11/2014 | Todt |
| 8,893,440 B2 | 11/2014 | Wetmore |
| 8,931,228 B2 | 1/2015 | Wiercinski et al. |
| 8,931,229 B2 | 1/2015 | Wiercinski et al. |
| 8,986,786 B2 | 3/2015 | Maier |
| 9,133,612 B2 | 9/2015 | Wiercinski et al. |
| 9,192,960 B2 | 11/2015 | Tanley |
| 9,238,203 B2 | 1/2016 | Scheibner |
| 9,266,144 B2 | 2/2016 | Maier |
| 9,394,464 B2 | 7/2016 | Wiercinski et al. |
| 9,476,196 B2 | 10/2016 | Wiercinski et al. |
| 9,562,174 B2 | 2/2017 | Russell |
| 9,731,314 B2 | 8/2017 | Maier |
| 10,704,254 B2 * | 7/2020 | Seabaugh ............ B32B 27/065 |
| 2002/0108564 A1 | 8/2002 | Gruenewald |
| 2003/0017292 A1 | 1/2003 | Sieber |
| 2003/0051807 A1 | 3/2003 | Yamaguchi |
| 2003/0056722 A1 | 3/2003 | Kitano et al. |
| 2003/0070391 A1 | 4/2003 | Tachauer |
| 2003/0165651 A1 | 9/2003 | Sieber |
| 2003/0180468 A1 | 9/2003 | Cray |
| 2004/0081794 A1 | 4/2004 | Titone |
| 2004/0137185 A1 | 7/2004 | Sieber |
| 2004/0137813 A1 | 7/2004 | Faucher |
| 2004/0224117 A1 | 11/2004 | Amano |
| 2005/0028938 A1 | 2/2005 | Hill |
| 2005/0058798 A1 | 3/2005 | Sieber |
| 2005/0069698 A1 | 3/2005 | Eubanks |
| 2005/0137549 A1 | 6/2005 | Lindsay et al. |
| 2006/0040091 A1 | 2/2006 | Bletsos |
| 2006/0051558 A1 | 3/2006 | Sieber |
| 2007/0042196 A1 | 2/2007 | Smith |
| 2007/0060732 A1 | 3/2007 | Yang |
| 2007/0110943 A1 | 5/2007 | Sieber |
| 2007/0281562 A1 | 12/2007 | Kohlman |
| 2007/0282080 A1 | 12/2007 | Kawakami |
| 2008/0022620 A1 | 1/2008 | Crowley |
| 2008/0058492 A1 | 3/2008 | Griswold |
| 2008/0114098 A1 | 5/2008 | Griswold |
| 2008/0135159 A1 | 6/2008 | Bries |
| 2008/0153924 A1 | 6/2008 | Caron |
| 2008/0258341 A1 | 10/2008 | Parkes |
| 2008/0289279 A1 | 11/2008 | Hannan |
| 2009/0075033 A1 | 3/2009 | Weston |
| 2009/0317583 A1 | 12/2009 | Naumann |
| 2010/0012882 A1 | 1/2010 | Sherman |
| 2010/0154338 A1 | 6/2010 | Riccelli |
| 2010/0307658 A1 | 12/2010 | Galush et al. |
| 2011/0151169 A1 | 6/2011 | Maier |
| 2011/0185666 A1 | 8/2011 | Russell |
| 2011/0244742 A1 | 10/2011 | Huang |
| 2012/0088052 A1 | 4/2012 | Cantu |
| 2012/0174508 A1 | 7/2012 | Brooks |
| 2012/0207998 A1 | 8/2012 | Ando |
| 2013/0004749 A1 | 1/2013 | Hao |
| 2013/0059105 A1 | 3/2013 | Wright |
| 2013/0084419 A1 | 4/2013 | Taylor |
| 2013/0196163 A1 | 8/2013 | Swanson |
| 2013/0274700 A1 | 10/2013 | Harris |
| 2014/0037882 A1 | 2/2014 | Georgeau |
| 2014/0093679 A1 | 4/2014 | Okamoto |
| 2014/0186566 A1 | 7/2014 | Wood |
| 2015/0024159 A1 | 1/2015 | Bess |
| 2015/0225614 A1 | 8/2015 | Kim |
| 2015/0267076 A1 | 9/2015 | Bodkhe |
| 2015/0298427 A1 | 10/2015 | Kronenberg |
| 2015/0368508 A1 | 12/2015 | Bodkhe |
| 2016/0024782 A1 | 1/2016 | Bess |
| 2017/0072430 A1 | 3/2017 | Maier |
| 2017/0218223 A1 | 8/2017 | Bodkhe |
| 2018/0237662 A1 * | 8/2018 | Widenbrant ............ E04B 1/625 |
| 2018/0245332 A1 * | 8/2018 | Widenbrant .......... B32B 27/065 |

FOREIGN PATENT DOCUMENTS

| | | |
|---|---|---|
| CN | 201047117 | 4/2008 |
| CN | 202866172 | 4/2013 |
| CN | 105331298 | 2/2016 |
| DE | 19817829 | 1/1999 |
| DE | 10031213 | 1/2002 |
| DE | 10255600 | 6/2004 |
| EP | 0372561 | 6/1990 |
| EP | 0676403 | 10/1995 |
| EP | 1289754 | 11/2003 |
| EP | 1459884 | 11/2006 |
| EP | 2 101 027 | 12/2014 |
| EP | 2 868 468 | 5/2015 |
| FR | 2917758 | 12/2008 |
| GB | 2473618 | 3/2011 |

(56) References Cited

FOREIGN PATENT DOCUMENTS

| | | |
|---|---|---|
| JP | S50156599 | 12/1975 |
| JP | S54006096 | 1/1979 |
| JP | S55-13767 | 1/1980 |
| JP | S55-13768 | 1/1980 |
| JP | S57164123 | 10/1982 |
| JP | S59-122541 | 7/1984 |
| JP | S6422904 | 1/1989 |
| JP | H03-2450 | 1/1991 |
| JP | H04-055444 | 9/1992 |
| JP | H06172631 | 6/1994 |
| JP | H06211922 | 8/1994 |
| JP | H08-053528 | 2/1996 |
| JP | 11071823 | 3/1999 |
| JP | H1160724 | 3/1999 |
| JP | H11100427 | 4/1999 |
| JP | H11116763 | 4/1999 |
| JP | 2000-169544 | 6/2000 |
| JP | 2000-169545 | 6/2000 |
| JP | 2001-072854 | 3/2001 |
| JP | 2001-294830 | 10/2001 |
| JP | 2001-323040 | 11/2001 |
| JP | 2002-155145 | 5/2002 |
| JP | 2002-212415 | 7/2002 |
| JP | 3313360 | 8/2002 |
| JP | 2002-249538 | 9/2002 |
| JP | 2004-137405 | 5/2004 |
| JP | 2004-137861 | 5/2004 |
| JP | 2008-303650 | 12/2008 |
| WO | WO 95/33007 | 12/1995 |
| WO | WO 1998-056866 | 12/1998 |
| WO | WO 2002-01013 | 1/2002 |
| WO | WO 2012-092019 | 7/2012 |
| WO | WO 2013-136108 | 9/2013 |
| WO | WO 2014-121007 | 8/2014 |
| WO | WO 2015-010208 | 1/2015 |
| WO | WO 2015-123007 | 8/2015 |
| WO | WO 2015-126645 | 8/2015 |
| WO | WO 2015-183354 | 12/2015 |
| WO | WO 2016-106273 | 6/2016 |
| WO | WO 2017-031275 | 2/2017 |
| WO | WO 2017-031359 | 2/2017 |
| WO | WO 2017-112756 | 6/2017 |

OTHER PUBLICATIONS

Pocius, "Adhesion and Adhesives Technology", Hanser/Gardner Publications., 1997 Cincinnati, Ohio, pp. 216-223.
Premium Self-adhering Water Resistive and Air Barrier, Delta Cosella Dorken, Spycor Building Products < https://www.spycorbuilding.com/Cosella-Dorken-DELTA-VENT-SA-p/dlvt-sa.htm > , pp. 1-3.
Satas, "Handbook of Pressure Sensitive Adhesive Technology", New York, Chapter 15, 1989, pp. 396-456.
Matyjaszewski, "Controlled/"living" radical polymerization. Atom transfer radical polymerization in the presence of transition-metal complexes", 1995., Journal of the American Chemical Society, vol. 117, No. 20, pp. 5614-5615.
International Search Report for PCT International Application No. PCT/US2018/019022, dated May 18, 2018, 8 pages.

\* cited by examiner

AIR AND WATER BARRIER ARTICLE INCLUDING INELASTIC POROUS LAYER

CROSS REFERENCE TO RELATED APPLICATIONS

This application is a national stage filing under 35 U.S.C. 371 of PCT/US2018/019022, filed Feb. 21, 2018, which claims the benefit of U.S. Application No. 62/462,707, filed Feb. 23, 2017, the disclosure of which is incorporated by reference in its entirety herein.

BACKGROUND

Air barrier systems control movement of air, and specifically water vapor, across a surface of a structure, such as a building enclosure. In exterior walls, uncontrolled air flow is the greatest source of moisture and condensation damage. Indoor comfort is affected by air temperature, relative humidity, direction of airflow and surrounding surface temperatures. Indoor air quality is enhanced by air barrier systems by efficiently keeping pollutants out of building interiors. Pollutants include water vapor, suspended particulates, dust, insects, and smells, for example. Air barrier systems have significant impact on electricity consumption and gas bills. Air barrier systems in nonresidential buildings are estimated to reduce air leakage by up to 83 percent, reduce heating bills more than 40% and reduce electricity consumption more than 25% according to simulations by the National Institute of Standards and Technology (NIST) compared to typical buildings without air barriers. Water vapor is a key ingredient in corrosion and mold growth. Air barrier systems help prevent water vapor from being transported by air movement between exteriors and interiors of structures, such as buildings.

The use of air barrier systems has been a requirement in Canada for almost 25 years and is becoming important in North America due to net zero energy requirements by 2030, required by the US Army Corp of Engineering, ASHRAE 90.1, and International Energy Conservation Code—2009. On Dec. 16, 2011, the DC Construction Codes Coordinating Board (CCCB) adopted the 2012 International Energy Conservation Code (IECC).

Some membrane sheets having both waterproofing properties and moisture permeability are known. One typical example of such moisture-permeable waterproofing sheets is flash-spun nonwoven fabrics. U.S. Pat. No. 3,169,899 (Steuber), for example, discloses a flash-spun nonwoven fabric. U.S. Pat. No. 3,532,589 (David) discloses a method for producing a flash-spun nonwoven fabric. The nonwoven fabric thus obtained has an appropriate pore size to block liquid water but allow water vapor to pass through. A known example of the nonwoven fabric is commercially available under the trade designation "Tyvek" from E.I. Du Pont de Nemours and Company, Wilmington, Del. USA, which is obtained by thermo-compressing a three-dimensionally-meshed fiber of high-density polyethylene. Such a moisture-permeable waterproofing sheet can prevent external liquid water from infiltrating through the sheet, but can vent water in vapor form.

A self-sealing air and water barrier article is described in WO 2015/183354 (Widenbrant et al.).

SUMMARY

Mechanical fasteners (e.g., nails) can be used to affix moisture-vapor permeable waterproofing sheeting on substrates of exterior walls. As a result, moisture may permeate from gaps of such fasteners, such as nail holes, over a long period of time. Penetration of the moisture-vapor permeable water proofing sheeting can also occur in other situations such as accidental punctures or tears in the sheeting. Typically and advantageously, air and water barrier articles according to the present disclosure can help alleviate moisture problems that occur from such breaches. In some embodiments, air and water barrier article can dissipate water in the plane of the inelastic porous layer. Water dissipating can be carried out, for example, by capillary action or any other suitable mechanism. In some embodiments, the air and water barrier article can absorb water.

In one aspect, the present disclosure provides an air and water barrier article that includes a polymer-coated inelastic porous layer, which includes a water-vapor permeable polymeric coating disposed on at least one major surface of the inelastic porous layer, and an adhesive disposed on a major surface of the polymer-coated inelastic porous layer. The inelastic porous layer includes at least one of surface-modified fibers or natural cellulose fibers. The adhesive is either exposed, in contact with a release surface, or adhered to a surface of a building component.

In another aspect, the present disclosure provides an air and water barrier article that includes a polymer-coated inelastic porous layer, which includes a water-vapor permeable polymeric coating disposed on at least one major surface of the inelastic porous layer, and an adhesive disposed on a major surface of the polymer-coated inelastic porous layer. The adhesive is either exposed, in contact with a release surface, or adhered to a surface of a building component. The polymer-coated inelastic porous layer has a water strike through time of not more than 180 seconds.

In another aspect, the present disclosure provides an air and water barrier article that includes a polymer-coated inelastic porous layer, which includes a water-vapor permeable polymeric coating disposed on at least one major surface of the inelastic porous layer, and an adhesive disposed on a major surface of the polymer-coated inelastic porous layer. The adhesive is either exposed, in contact with a release surface, or adhered to a surface of a building component. The air and water barrier article has an absorbance capacity of at least one-half gram per 116 square centimeters.

In another aspect, the present disclosure provides a building component to which any of the aforementioned air and water barrier article is adhered.

In another aspect, the present disclosure provides a method of applying an air and water barrier article. The method includes adhering at least a portion of the adhesive on a roll of the aforementioned air and water barrier article to the surface of the building component, so that the air and water barrier article is affixed to the surface of the building component, and unwinding at least a portion of the roll, wherein during the unwinding, the liner remains disposed on the polymer-coated inelastic porous layer. In some embodiments, the method further includes removing the liner from polymer-coated inelastic porous layer.

Typically and advantageously, the air and water barrier article according to the present disclosure passes ASTM D-1970/D-1970M-13 or similar modified tests such as Modified Test 1 of ASTM D-1970/D-1970M-13, Modified Test 2 of ASTM D-1970/D-1970M-13, Modified Test 3 of ASTM D-1970/D-1970M-13, or combinations thereof for nail sealability. In some cases, not only can the polymeric coating seal a penetration, but any water that may enter into such a penetration can be at least one of dissipated or absorbed in the inelastic porous layer in the area surrounding the nail penetration.

As used in this specification, the recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following defined terms, these definitions shall be applied for the entire Specification, including the claims, unless a different definition is provided in the claims or elsewhere in the Specification based upon a specific reference to a modification of a term used in the following glossary.

The words "a", "an", and "the" are used interchangeably with "at least one" to mean one or more of the elements being described.

The term "layer" refers to any material or combination of materials on or overlaying a substrate.

Words of orientation such as "atop, "on," "covering," "uppermost," "overlaying," "underlying" and the like for describing the location of various layers, refer to the relative position of a layer with respect to a horizontally-disposed, upwardly-facing substrate. It is not intended that the substrate, layers or articles encompassing the substrate and layers, should have any particular orientation in space during or after manufacture.

The terms "about" or "approximately" with reference to a numerical value or a shape means +/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec.

The term "inelastic" as used herein mean materials having an elongation of less than 90 percent in any direction (e.g., the cross direction or the machine direction). In some embodiments, the inelastic porous layer has an elongation of at least 5, 10, 15, 20, 25, 30, 40, or 50 percent. In some embodiments, the inelastic porous layer has an elongation of less than 50, 40, 30, 25, 20, 15, 10, or 5 percent. Inelastic materials generally also have low recovery from elongation (e.g., up to 40, 25, 20, 10 or 5 percent recovery).

The term "substantially" with reference to a property or characteristic means that the property or characteristic is exhibited to a greater extent than the opposite of that property or characteristic is exhibited.

The term "(meth)acrylate" with respect to a monomer, oligomer or means a vinyl-functional alkyl ester formed as the reaction product of an alcohol with an acrylic or a methacrylic acid.

The term "(co)polymer" or "(co)polymeric" includes homopolymers and copolymers, as well as homopolymers or copolymers that may be formed in a miscible blend, e.g., by coextrusion or by reaction, including, e.g., transesterification. The term "copolymer" includes random, block, graft, and star copolymers.

The term "water vapor permeable" as used herein means an article having a permeance of more than 1 perm (inch-pounds units) according to ASTM E 96 Procedure A (Desiccant Method).

The term "continuous" as used herein means a coating having an uninterrupted extension along a two dimensional surface. For example, in some embodiments, in an air and water barrier article having a continuous water-permeable polymer coating, the water-permeable polymeric coating covers a major surface of the inelastic porous layer.

The term "discontinuous" as used herein means a coating having an interrupted extension along a two dimensional surface. For example, in some embodiments, an air and water barrier article having a discontinuous coating of pressure sensitive adhesive does not cover a major surface of a polymeric layer or a major surface of a porous layer.

The term "air and water barrier" as used herein means material that is designed and constructed to provide the principal plane of air tightness through an environmental separator and that has an air permeance rate no greater than 0.02 L per square meter per second at a pressure difference of 75 Pa when tested in accordance with ASTM E 2178-13 and provides acceptable barrier performance with respect to water according to AATCC 127-2013. In some embodiments, the air and water barrier is impermeable to liquid water at 55 cm of water pressure.

The phrase "comprises at least one of" followed by a list refers to comprising any one of the items in the list and any combination of two or more items in the list. The phrase "at least one of" followed by a list refers to any one of the items in the list or any combination of two or more items in the list.

Various aspects and advantages of exemplary embodiments of the present disclosure have been summarized. The above Summary is not intended to describe each illustrated embodiment or every implementation of the present disclosure. Further features and advantages are disclosed in the embodiments that follow. The Drawings and the Detailed Description that follow more particularly exemplify certain embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

While the above-identified drawing, which may not be drawn to scale, sets forth various embodiments of the present disclosure, other embodiments are also contemplated, as noted in the Detailed Description. In all cases, this disclosure describes the presently disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

Figure 1:
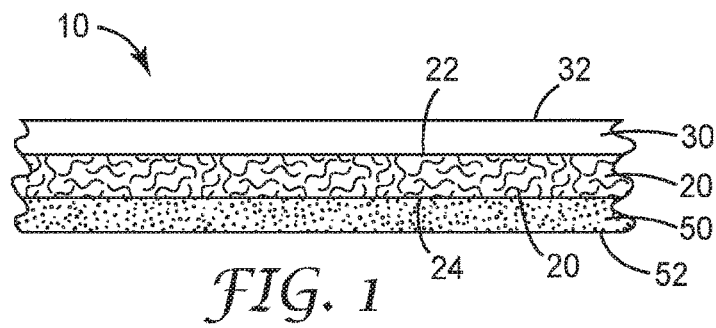
FIG. 1 is a side cross section view of an embodiment of an air and water barrier article according to the present disclosure.

FIG. 1 illustrates an embodiment of an air and water barrier article 10 according to the present disclosure. The air and water barrier article 10 includes a water-vapor permeable polymer coating 30 disposed on a first major surface 22 of an inelastic porous layer 20. An adhesive 50 is disposed on a second major surface 24 of the inelastic porous layer 20 opposite the first major surface 22. In the illustrated embodiment, the adhesive is exposed and can be useful for adhering the air and water barrier 10 article to various surfaces.

Figure 2:
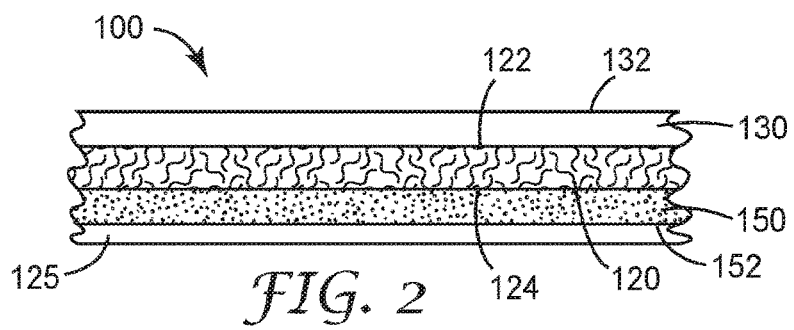
FIG. 2 is a side cross section view of an embodiment of an air and water barrier article according to the present disclosure including a liner.

FIG. 2 illustrates another embodiment of an air and water barrier article 100 according to the present disclosure. The air and water barrier article 100 includes a water-vapor permeable polymer coating 130 disposed on a first major surface 122 of an inelastic porous layer 120. Adhesive 150 is disposed on a second major surface 124 of the inelastic porous layer 120 opposite the first major surface 122. In the illustrated embodiment, a surface 152 of the adhesive 150 is attached to a substrate 125. The substrate 125 can be, for example, a liner having a release surface in contact with surface 152 or a building component. Both of these substrates are described in further detail below.

Figure 3A:
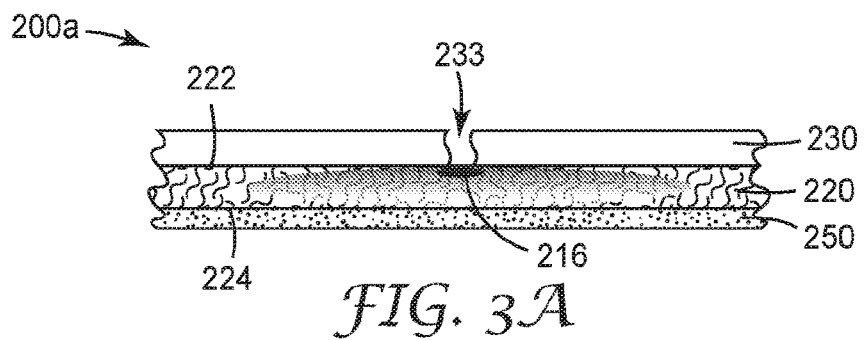
FIG. 3A is a side cross section view of an embodiment of an air and water barrier article according to the present disclosure that includes a penetration.

FIG. 3A illustrates another embodiment of an air and water barrier article 200a according to the present disclosure including a breach 233 in the water-vapor permeable polymer coating 230. The air and water barrier article 200a includes a water-vapor permeable polymer coating 230 disposed on a first major surface 222 of an inelastic porous layer 220. Adhesive 250 is disposed on a second major surface 224 of the inelastic porous layer 220 opposite the first major surface 222. Any water 216 that may enter the breach 233 can be at least one of dissipated by or absorbed by the inelastic porous layer 220.

Figure 3B:
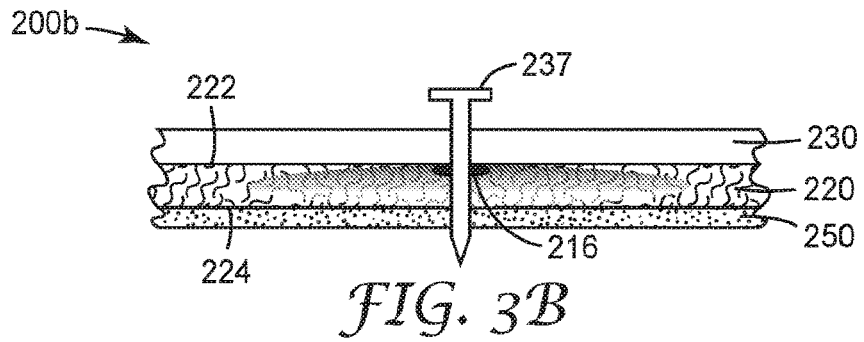
FIG. 3B is a side cross section view of another embodiment of an air and water barrier article according to the present disclosure that includes a penetration.

FIG. 3B illustrates another embodiment of an air and water barrier article 200b according to the present disclosure that has been penetrated by a fastener 237. The air and water barrier article 200b includes a water-vapor permeable polymer coating 230 disposed on a first major surface 222 of an inelastic porous layer 220. Adhesive 250 is disposed on a second major surface 224 of the inelastic porous layer 220 opposite the first major surface 222. Any water 216 that may enter through the penetration can be at least one of dissipated by or absorbed by the inelastic porous layer 220.

Figure 4:
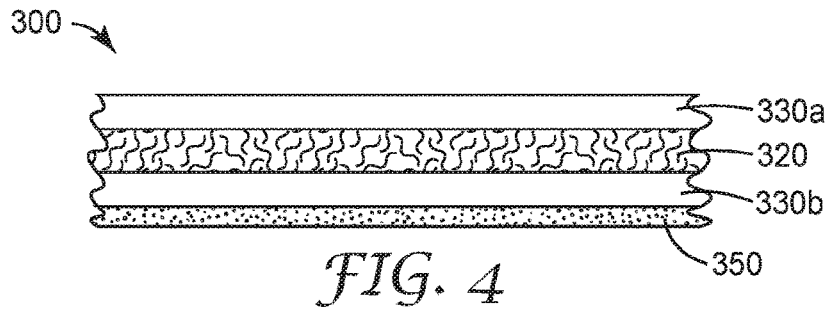
FIG. 4 is a side cross section view of an embodiment of an air and water barrier article according to the present disclosure including multiple water-vapor permeable coatings.

In some embodiments, including the embodiment shown in FIG. 4, the air and water barrier article 300 according to the present disclosure includes inelastic porous layer 320 having water-vapor permeable polymer coatings 330a and 330b disposed on both major surfaces. In these embodiments, the inelastic porous layer 320 may be said to be encapsulated by the water-vapor permeable polymer coating 330a, 330b. Air and water barrier article 300 further includes adhesive 350 disposed on water-vapor permeable polymer coating 330b.

Referring again to FIGS. 1 to 4, in some embodiments of any of the air and water barrier articles 10, 100, 200, and 300, the adhesive 50, 150, 250, 350 is a permeable pressure sensitive adhesive that is continuously disposed on at least one of a major surface 24, 124, 224 of the inelastic porous layer 20, 120, 220, a major surface of the water-vapor permeable polymer coating 330b, or combinations thereof. In some embodiments, the pressure sensitive adhesive is disposed only on one surface of the air and water barrier article. In some embodiments, the adhesive 50, 150, 250, 350 is discontinuously disposed on at least one of the aforementioned surfaces 24, 124, 224 or on water-vapor permeable coating 330b in a random manner. In some embodiments, the adhesive 50, 150, 250, 350 is discontinuously disposed on at least one of the aforementioned surfaces 24, 124, 224 or on water-vapor permeable coating 330b in a patterned manner. Further details about discontinuous coatings of adhesive are described below.

The inelastic porous layer useful in the air and water barrier articles according to the present disclosure may comprise a variety of suitable materials including woven fabrics, nonwoven webs, knitted fabrics, netting, scrim, and combinations thereof. In some embodiments, the inelastic porous layer comprises a fibrous material (e.g., a woven, nonwoven, or knit material). Useful inelastic porous layers may be made of natural fibers (e.g., natural cellulosic fibers such as wood or cotton fibers), synthetic fibers (e.g., thermoplastic fibers), or a combination of natural and synthetic fibers. Examples of suitable materials for forming thermoplastic fibers include polyolefins (e.g., polyethylene, polypropylene, polybutylene, ethylene copolymers, propylene copolymers, butylene copolymers, and copolymers and blends of these polymers), polyesters, rayon, polyamides, and polylactic acid. The fibers may also be multi-component fibers, for example, having a core of one thermoplastic material and a sheath of another thermoplastic material. The term "nonwoven" refers to a material having a structure of individual fibers or threads that are interlaid but not in an identifiable manner such as in a knitted fabric. Examples of nonwoven webs include spunbond webs, spunlaced webs, airlaid webs, wetlaid webs, meltblown webs, and bonded carded webs. In some embodiments, the substrate comprises multiple layers of nonwoven materials with, for example, at least one layer of a meltblown nonwoven and at least one layer of a spunbonded nonwoven, or any other suitable combination of nonwoven materials. For example, the inelastic porous layer may be a spunbond-meltblown-spunbond, spunbond-spunbond, or spunbond-spunbond-spunbond multilayer material. In some embodiments, the inelastic porous layer is a nonwoven comprising fibers selected from polyester, polylactic acid, polyolefin, polyamide, rayon, and combinations thereof.

In some embodiments, the fibers in the fibrous inelastic layer are surface-modified. Useful methods of surface modification include electrical discharge in the presence of a suitable reactive or non-reactive atmosphere (e.g., plasma, glow discharge, corona discharge, dielectric barrier discharge or atmospheric pressure discharge); chemical pretreatment; UV flash lamp pretreatment; or flame pretreatment. Any of these methods may be useful, for example, for incorporating polar functional groups on the surface of the fibers. Examples of polar functional groups include carboxylic acid (i.e., —COOH) groups and hydroxyl (i.e., —OH) groups.

In some embodiments, the fibers in the fibrous inelastic porous layer are surface-modified by treatment with surfactants. Useful surfactants (also known as emulsifiers) include anionic, cationic, amphoteric, and nonionic surfactants. Useful anionic surfactants include alkylarylether sulfates and sulfonates, alkylarylpolyether sulfates and sulfonates (e.g., alkylarylpoly(ethylene oxide) sulfates and sulfonates, including those having up to about 4 ethyleneoxy repeat units, including sodium alkylaryl polyether sulfonates such as those known under the trade designation "TRITON X200", available from Rohm and Haas, Philadelphia, Pa.), alkyl sulfates and sulfonates (e.g., sodium lauryl sulfate, ammonium lauryl sulfate, triethanolamine lauryl sulfate, and sodium hexadecyl sulfate), alkylaryl sulfates and sulfonates (e.g., sodium dodecylbenzene sulfate and sodium dodecylbenzene sulfonate), alkyl ether sulfates and sulfonates (e.g., ammonium lauryl ether sulfate), and alkylpolyether sulfate and sulfonates (e.g., alkyl poly(ethylene oxide) sulfates and sulfonates, including those having up to about 4 ethyleneoxy units). Useful nonionic surfactants include ethoxylated oleoyl alcohol and polyoxyethylene octylphenyl ether. Useful cationic surfactants include mixtures of alkyl dimethylbenzyl ammonium chlorides, wherein the alkyl chain has from 10 to 18 carbon atoms. Amphoteric surfactants are also useful and include sulfobetaines, N-alkylaminopropionic acids, and N alkylbetaines. Surfactants may be added to the fibers disclosed herein, for example, in an amount sufficient on average to make a monolayer coating over the surfaces of the fibers to impart a desired level of wettability and hydrophilicity. Useful amounts of surfactants may be in a range, for example, from 0.05 to 3 percent by weight, based on the total weight of the inelastic porous layer. A surfactant can be applied to the inelastic porous layer by any conventional means (e.g., spraying, printing, dipping, or brush coating). Several surfactant-treated fibrous materials are also commercially available. For example, a spunbond polyester nonwoven fabric having a fabric weight of 80 grams/square meter, available as Type 062 Grey from Freudenberg Performance Materials LP, Durham, N.C., is treated with surfactant.

In some embodiments, inelastic porous layer can be surface modified by including additives in the polymer during fiber formation. An additive such as a surfactant (e.g., any of those described above) used during fiber formation can migrate to the surface to provide a surface-modified inelastic porous layer.

In some embodiments, the inelastic porous layer comprises natural cellulosic fibers. Examples of useful natural cellulosic fibers include those from wood, cotton, flax, hemp, jute, and ramie. For inelastic porous layers including natural cellulosic fibers, the natural cellulosic fibers may or may not be surface-modified using any of the methods described above.

Inelastic porous layers that are surface-modified using any of the methods described above, include natural cellulosic fibers, or include other fibers such as polyamide, polyester, or rayon fibers are generally hydrophilic. The inelastic porous layer may be considered to be hydrophilic or have a hydrophilic surface if water can spread on the surface, and the contact angle of a bead of water on the surface is less than about 90 degrees.

In general, the inelastic porous layer is not considered a barrier material on its own.

A variety of water-vapor permeable polymeric materials are useful in the air and water barrier articles according to the present disclosure for coating and in some embodiments at least partially impregnating and/or encapsulating the inelastic porous layer described above in any of its embodiments. In some embodiments, the polymeric material is a polyoxyalkylene polymer having at least one end group derived from an alkoxy silane. The polyoxyalkylene polymer may be silane terminated. In some embodiments, the polyoxyalkylene polymer further comprises at least one silane modified branched group. When the polymeric coating is cured, the alkoxy silane groups condense to form crosslink sites.

A production method of a polyoxyalkylene polymer having a reactive silicon group may include those proposed in Japanese Kokoku Publication S45-36319, Japanese Kokoku Publication S46-12154, Japanese Kokai Publication S50-156599, Japanese Kokai Publication S54-6096, Japanese Kokai Publication S55-13767, Japanese Kokai Publication S55-13468, Japanese Kokai Publication S57-164123, Japanese Kokoku Publication H3-2450, U.S. Pat. Nos. 3,632, 557, 4,345,053, 4, 366, 307, and 4,960, 844. Also, useful polymers for the air and water barrier articles according to the present disclosure include polyoxyalkylene polymers having a number average molecular weight of 6,000 or higher and a Mw/Mn ratio of 1.6 or lower and thus having high molecular weight and narrow molecular weight distribution as disclosed in Japanese Kokai Publication S61-197631, Japanese Kokai Publication S61-215622, Japanese Kokai Publication S61-215623, Japanese Kokai Publication S61-218632, Japanese Kokai Publication H3-72527, Japanese Kokai Publication H3-47825, and Japanese Kokai Publication H8-231707.

In some embodiments, the main chain of the polyoxyalkylene polymer may contain other functional groups such as a urethane bond. The aforementioned urethane bond component is not particularly limited and may include a segment (hereinafter, also referred to as an amido segment) produced by reaction of an isocyanato group and an active hydrogen group.

The amido segment can be represented by the following formula:

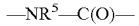
—NR$^5$—C(O)—

(wherein R$^5$ represents a hydrogen atom or a monovalent organic group, desirably a substituted or unsubstituted monovalent C$_{1-20}$ hydrocarbon group, and more desirably a substituted or unsubstituted monovalent C$_{1-8}$ hydrocarbon group).

The aforementioned amido segment may be part of a urethane group produced, for example, by reaction of an isocyanato group and a hydroxy group; a urea group produced by reaction of an isocyanato group and an amino group; and a thiourethane group produced by reaction of an isocyanato group and a mercapto group. Also, in the present disclosure, groups produced by reaction of an active hydrogen in the aforementioned urethane group, urea group, and thiourethane group with another isocyanato group also include a segment represented by the formula —NR$^5$—C(O)—.

Examples of methods for industrially producing a polyoxyalkylene polymer having an amido segment and a reactive silicon group include those disclosed in Japanese Kokoku Publication S46-12154 (U.S. Pat. No. 3,632,557), Japanese Kokai Publications S58-109529 (U.S. Pat. No. 4,374,237), S62-13430 (U.S. Pat. No. 4,645,816), H8-53528 (EP 0676403), and H10-204144 (EP 0831108), Japanese Kohyo Publication 2003-508561 (U.S. Pat. No. 6,197,912), Japanese Kokai Publications H6-211879 (U.S. Pat. No. 5,364,955), H10-53637 (U.S. Pat. No. 5,756,751), H11-100427, 2000-169544, 2000-169545 and 2002-212415, Japanese Patent No. 3,313,360, U.S. Pat. Nos. 4,067,844 and 3,711,445, Japanese Kokai Publications 2001-323040, H11-279249 (U.S. Pat. No. 5,990,257), 2000-119365 (U.S. Pat. No. 6,046,270), S58-29818 (U.S. Pat. No. 4,345,053), H3-47825 (U.S. Pat. No. 5,068,304), H11-60724, 2002-155145, and 2002-249538, WO03/018658, WO03/059981, and Japanese Kokai Publication H6-211879 (U.S. Pat. No. 5,364,955), H10-53637 (U.S. Pat. No. 5,756,751), H10-204144 (EP0831108), 2000-169544, 2000-169545, and 2000-119365 (U.S. Pat. No. 6,046,270).

A (meth) acrylic ester polymer having a reactive silicon group may be added to the polyoxyalkylene polymer having a reactive silicon group, if desired. Various (meth) acrylic ester monomers may be useful for providing the main chain of the (meth) acrylic ester polymer. Examples of useful (meth) acrylic ester monomers include methyl (meth) acrylate, ethyl (meth) acrylate, n-propyl (meth) acrylate, isopropyl (meth) acrylate, n-butyl (meth) acrylate, isobutyl (meth) acrylate, t-butyl (meth) acrylate, n-pentyl (meth) acrylate, n-hexyl (meth) acrylate, cyclohexyl (meth) acrylate, n-heptyl (meth) acrylate, n-octyl (meth) acrylate, 2-ethylhexyl (meth) acrylate, nonyl (meth) acrylate, decyl (meth) acrylate, dodecyl (meth) acrylate, phenyl (meth) acrylate, tolyl (meth) acrylate, benzyl (meth) acrylate, 2-methoxyethyl (meth) acrylate, 3-methoxybutyl (meth) acrylate, 2-hydroxyethyl (meth) acrylate, 2-hydroxypropyl (meth) acrylate, stearyl (meth) acrylate, glycidyl (meth) acrylate, 2-aminoethyl (meth) acrylate, gamma-(methacryloyloxypropyl) trimethoxysilane, gamma-(methacryloyloxypropyl) dimethoxymethylsilane, methacryloyloxymethyltrimethoxysilane, methacryloyloxymethyltriethoxysilane, methacryloyloxymethyldimethoxymethylsilane, methacryloyloxymethyldiethoxymethylsilane, ethylene oxide adduct of (meth) acrylic acid, trifluoromethylmethyl (meth) acrylate, 2-trifluoromethylethyl (meth) acrylate, 2-perfluoroethylethyl (meth) acrylate, 2-perfluoroethyl-2-perfluorobutylethyl (meth) acrylate, perfluoroethyl (meth) acrylate, trifluoromethyl (meth) acrylate, bis (trifluoromethyl) methyl (meth) acrylate, 2-trifluoromethyl-2-perfluoroethylethyl (meth) acrylate, 2-perfluorohexylethyl (meth) acrylate, 2-perfluorodecylethyl (meth) acrylate, and 2-perfluorohexadecylethyl (meth) acrylate.

With respect to the (meth) acrylic ester polymer, vinyl monomers can be copolymerized together with a (meth) acrylic ester monomer. Examples of suitable vinyl monomers include styrene monomers such as styrene, vinyltoluene, alpha-methylstyrene, chlorostyrene, styrenesulfonic acid and its salts; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, and monoalkyl and dialkyl esters of maleic acid; fumaric acid, and monoalkyl and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amido group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; and vinyl chloride, vinylidene chloride, allyl chloride, and allyl alcohol. Any of these monomers may be used alone or any combination of them may be copolymerized with the (meth) acrylic acid monomer. In some embodiments, polymers comprising a styrene monomer and/or a (meth)acrylic acid monomer are desirable. In the above descriptions, (meth) acrylic acid means acrylic acid and/or methacrylic acid.

The (meth) acrylic ester polymer can be prepared, for example, by a conventionally known method. For example, a "living radical polymerization" method can be conveniently employed in order to obtain a (meth) acrylic ester polymer having narrow molecular weight distribution and low viscosity and having a reactive silicon group at a molecular chain end at a high ratio. An "atom transfer radical polymerization" method is a living radical polymerization method useful for polymerizing a (meth) acrylic ester monomer using, for example, an organic halide or a halogenated sulfonyl compound as an initiator and a transition metal complex as a catalyst. An atom transfer radical polymerization method advantageously has a wide range of options for the initiator and the catalyst. Because a halogen is located at a molecular chain end, which is relatively advantageous for a functional group conversion reaction, the atom transfer radical polymerization method is useful as a production method of the (meth) acrylic ester polymer having a specified functional group. Examples of the atom transfer radical polymerization method include the method disclosed in Krzysztof Matyjaszewski et al., J. Am. Chem. Soc, vol. 117, p. 5614 (1995) and the method disclosed in Japanese Kokai Publication H9-272714.

Other examples of a production method of the (meth) acrylic ester polymer having a reactive silicon group are production methods employing free radical polymerization methods using chain transfer agents and disclosed in Japanese Kokoku Publication H3-14068, Japanese Kokoku Publication H4-55444, and Japanese Kokai Publication H6-211922. The above-mentioned (meth) acrylic ester polymers having a reactive silicon group may be used alone or two or more kinds of them may be used in combination.

Examples of methods for producing an organic polymer involving blending a polyoxyalkylene polymer having a reactive silicon group with a (meth) acrylic ester polymer having a reactive silicon group include those disclosed in Japanese Kokai Publication S59-122541, S63-11264, H6-172631, and H11-116763. Further, a production method for a polyoxyalkylene polymer obtained by blending the (meth) acrylic ester polymer having a reactive silicon group may also include a method of polymerizing a (meth) acrylic ester monomer in the presence of a polyoxyalkylene polymer having a reactive silicon group. Examples of these methods include those disclosed in Japanese Kokai Publication 559-78223, Japanese Kokai Publication S59-168014, Japanese Kokai Publication S60-228516, and Japanese Kokai Publication 560-228517.

Some of the silyl terminated polymers useful in the air and water barrier articles according to the present disclosure are commercially available, for example, from Kaneka Corporation under the trade designations "KANEKA MS POLYMER" and "KANEKA SILYL", and from Union Carbide Specialty Chemicals Division under the trade designations "SILMOD-SAT10", "SILMOD SAT30", "SILMOD SAT 200", "SILMOD S203", "SILMOD S303", "SILMOD 20A", to name several, which were obtained from Union Carbide Company. It has been reported that resins available under the trade designation "SILMOD" have substantially the same chemistries as some resins available under the trade designations "MS" and "SILYL" from Kanegafuchi Kagaku Kogyo Kabushiki Kaisha, Osaka Japan. For example, the material available under trade designation "SILMOD 5203" corresponds to the material available under trade designation "MS S203", the material available under trade designation "SILMOD 5303" corresponds to the material available under trade designation "MS S303", and the material available under trade designation "SILMOD 20A" corresponds to the material available under trade designation "MS 20A". In further examples, the composition available under the trade designation "SILMOD SAT10" corresponds to the composition available under the trade designation "SILYL SAT10", the composition available under the trade designation "SILMOD SAT30" corresponds to the composition available under the trade designation "SILYL SAT30", and the composition available under the trade designation "SILMOD 200" corresponds to the composition available under the trade designation "SILYL 200".

Materials useful in the presently disclosed polymeric layer include solid materials and foam materials. In some embodiments, the foam material includes closed cell foams.

Water-vapor permeable polymer coatings useful for the air and water barrier articles of the present disclosure may optionally include various additives such as dehydrating agents, rheology additives, compatibilizers, tackifiers, physical property modifiers, photocurable substances, oxygen-curable substances, storage stability improving agents, fillers, epoxy resins, epoxy resin curing agents antioxidants, adhesion promoters, ultraviolet absorbers, metal deactivators, antiozonants, antioxidants, light stabilizers, lubricants, amine type radical chain inhibitors, phosphorus-containing peroxide decomposers, lubricants, pigments, foaming agents, solvents, flame retardants, antifungal agents, blowing agents, and antistatic agents, each in an adequate amount. These additives may be added singly to the polymeric material or two or more thereof may be added in combination to the polymeric material. Specific examples of these additives are disclosed in publications such as Japanese Kokoku Publications H4-69659 and H7-108928, and Japanese Kokai Publications S63-254149, S64-22904, 2001-72854, and 2008-303650.

In the water-vapor permeable polymeric coatings useful for the air and water barrier articles of the present disclosure, at least one of UV stabilizers or antioxidants may be present in an amount from 0 to 5 parts per 100 parts of the silyl terminated polymer. These materials improve heat stability and UV resistance. Some useful UV stabilizers and antioxidants are commercially available, for example, those available under the trade designations "TINUVIN 770", "TINUVIN 327", "TINUVIN 1130" and "TINUVIN 292" from BASF, Florham Park, N.J.

In some embodiments, the water-vapor permeable polymer coating composition useful for practicing the present disclosure includes at least 0.1 weight percent (wt %), in some embodiments at least 0.5 wt % of one or more water scavengers, and at most 5 wt %, in some embodiments at most 2 wt % of one or more water scavengers. Examples of suitable water scavengers include silanes such as vinyltrimethoxysilane, vinyltriethoxysilane, vinylmethyldimethoxysilane, O-methylcarbamatomethyl-methyldimethoxysilane, O-methylcarbamatomethyl-trimethoxysilane, O-ethylcarbamatomethyl-methyldiethoxysilane, O-ethylcarbamatomethyl-triethoxysilane, 3-methacryloyloxypropyl-trimethoxysilane, methacryloyloxymethyl-trimethoxysilane, methacryloyloxymethylmethyldimethoxysilane, methacryloyloxymethyltriethoxysilane, methacryloxymethylmethyl-diethoxysilane, 3-acryloxyoylpropyl-trimethoxysilane, acryloyloxymethyltrimethoxysilane, acryloyloxymethylmethyldimethoxysilane, acrylmethyltriethoxysilane, acryloyloxymethylmethyldiethoxysilane, alkylalkoxysilanes in general, and further functionalized organosilanes and other aminosilanes, which are also described below as adhesion promoters.

In some embodiments, the water-vapor permeable polymer coating composition useful for practicing the present disclosure include at least 0.1 wt %, in some embodiments, at least 0.5 wt %, of one or more adhesion promoters. In some embodiments, the presently disclosed polymeric materials include at most 5 wt %, in some embodiments, at most 2 wt %, of one or more adhesion promoters. Useful adhesion promoters include those available under the trade designations "A1120", "A187", and "A189" from OSI and "Z9020" from Dow Chemical. Amino silanes can be used as adhesion promoters. Examples of amino silane useful as adhesion promoters include gamma-aminopropyltrimethoxysilane, gamma-aminopropyltriethoxysilane, gamma-aminopropyltriisopropoxysilane, gamma-aminopropylmethyldimethoxysilane, gamma-aminopropylmethyldiethoxysilane, gamma-(2-aminoethyl)aminopropyltrimethoxysilane, gamma-(2-aminoethyl)aminopropylmethyldimethoxysilane, gamma-(2-aminoethyl)aminopropyltriethoxysilane, gamma-(2-aminoethyl)aminopropylmethyldiethoxysilane, gamma-(2-aminoethyl)aminopropyltriisopropoxysilane, gamma-(6-aminohexyl)aminopropyltrimethoxysilane, 3-(N-ethylamino)-2-methylpropyltrimethoxysilane, 2-aminoethylaminomethyltrimethoxysilane, N-cyclohexylaminomethyltriethoxysilane, N-cyclohexylaminomethyldiethoxymethylsilane, gamma-ureidopropyltrimethoxysilane, gamma-ureidopropyltriethoxysilane, N-phenyl-gamma-aminopropyltrimethoxysilane, N-phenylaminomethyltrimethoxysilane, N-benzyl-gamma-aminopropyltrimethoxysilane, N-vinylbenzyl-gamma-aminopropyltriethoxysilane, N,N'-bis[3-trimethoxysilyl]propyl]ethylenediamine, N-cyclohexylaminomethyltrimethoxysilane, N-cyclohexylaminomethyldimethoxymethylsilane, and N-phenylaminomethyltrimethoxysilane.

In some embodiments, the water-vapor permeable polymer coating composition useful for practicing the present disclosure may comprise one or more catalysts. The catalyst may be present in the polymeric material in an amount of from about 0.05 wt % to about 5 wt %, in some embodiments from about 0.1 wt % to about 2 wt %, and in some embodiments, from about 0.1 wt % to about 1 wt %. Useful catalysts include organometallic compounds which are known as silanol condensation catalysts. The silanol condensation catalyst may be used in an amount of from about 0.01 to about 20 parts by weight per 100 parts by weight of the silyl-terminated polymer, in some embodiments, from about 0.1 to about 10 parts by weight per 100 parts by weight of the silyl-terminated polymer. Examples of suitable silanol condensation catalysts include titanate esters such as tetrabutyl titanate and tetrapropyl titanate; organotin compounds such as dibutyltin dilaurate, dibuytltin maleate, dibutyltin diacetate, stannous octylate, stannous napthenate, reaction products from dibutyltin oxide and phthalate esters, and dibutyltin diacetylacetonate; organoaluminum compounds such as aluminum trisacetylacetonate, aluminum tris(ethylacetoacetate) and diisopropocyaluminum ethyl acetoacetate; reaction products from bismuth salts and organic carboxylic acids, such as bismuth tris(2-ethylhexonate) and bismuth tris(neodecanoate); chelate compounds such as zirconium tetra-acetylacetonate and titanium tetra-acetylactonate;

organolead compounds such as lead octylate; organovanadium compounds; amines such as butylamine, octylamine, dibutylamine, monoethanolamine, oleylamine, cyclohexylamine, benzylamine, diethylaminopropylamine, xylenediamine, triethylenediamine, guanidine, diphenylguanidine, 2,4,6-tris(dimethylaminomethyl)phenol, morpholine, N-methylmorpholine, 2-ethyl-4-methylimidazole with carboxylic or other acids; low-molecular-weight polyamide resins derived from excess polyamines and polybasics acids; and reaction products from excess polyamines and epoxy compounds. Any of these may be used individually or in combination.

In some embodiments, water-vapor permeable polymer coatings useful for practicing the present disclosure comprise one or more pigments or fillers. Useful fillers are typically solids that are non-reactive with the other components of the polymeric material, porous material, and coating compositions. Useful fillers include, for example, clay, talc, dye particles, pigments and colorants (for example, titanium dioxide and carbon black), glass beads, metal oxide particles, silica particles, ceramic microspheres, hollow polymeric microspheres (such as those available under the trade designation "EXPANCEL 551 DE" from Akzo Nobel, Duluth, Ga.), hollow glass microspheres (such as those available under the trade designation "K37" from 3M Co., St Paul, Minn.), carbonates, metal oxides, silicates (e.g. talc, asbestos, clays, mica), sulfates, silicon dioxide and aluminum trihydrate.

Some specific examples include ground or light calcium carbonate (with or without a surface-treatment such as a fatty acid, resin acid, cationic surfactant, or anionic surfactant); magnesium carbonate; talc; sulfates such as barium sulfate; alumina; metals in powder form (e.g., aluminum, zinc and iron); bentonite; kaolin clay; quartz powder; and combinations of two or more of these.

Examples of useful organic pigments include halogenated copper phthalocyanines, aniline blacks, anthraquinone blacks, benzimidazolones, azo condensations, arylamides, diarylides, disazo condensations, isoindolinones, isoindolines, quinophthalones, anthrapyrimidines, flavanthrones, pyrazolone oranges, perinone oranges, beta-naphthols, arylamides, quinacridones, perylenes, anthraquinones, dibromanthrones, pyranthrones, diketopyrrolo-pyrrole pigments (DPP), dioxazine violets, copper and copper-free phthalocyanines, and indanthrones.

Examples of useful inorganic pigments include titanium dioxide, zinc oxide, zinc sulphide, lithopone, antimony oxide, barium sulfate, carbon black, graphite, black iron oxide, black micaceous iron oxide, brown iron oxides, metal complex browns, lead chromate, cadmium yellow, yellow oxides, bismuth vanadate, lead chromate, lead molybdate, cadmium red, red iron oxide, Prussian blue, ultramarine, cobalt blue, chrome green (Brunswick green), chromium oxide, hydrated chromium oxide, organic metal complexes, and laked dye pigments.

The filler can also comprise conductive particles (see, for example, U.S. Patent Application Pub. No. 2003/0051807, which is incorporated herein by reference) such as carbon particles or metal particles of silver, copper, nickel, gold, tin, zinc, platinum, palladium, iron, tungsten, molybdenum, solder or the like, or particles prepared by covering the surface of these particles with a conductive coating of a metal or the like. It is also possible to use non-conductive particles of a polymer such as polyethylene, polystyrene, phenol resin, epoxy resin, acryl resin or benzoguanamine resin, or glass beads, silica, graphite or a ceramic, whose surfaces have been covered with a conductive coating of a metal.

In some embodiments, the water-vapor permeable polymer coating includes inorganic solids such as talc, titanium dioxide, silica, zirconia, calcium carbonate, calcium magnesium carbonate, glass or ceramic microspheres, or combinations thereof. In some embodiments, the water-vapor permeable polymer coating includes at least one of titanium dioxide or calcium carbonate.

In some embodiments, the water-vapor permeable polymer coating useful for practicing the present disclosure comprises a plasticizer. In some of these embodiments, the plasticizer does not contain any groups reactive toward silane/alkoxysilane. Examples of suitable plasticizers for the polymeric material include which polyethers, polyether esters, esters of organic carboxylic acids or anhydrides thereof, such as phthalates (e.g., dialkyl phthalates such as di-(2-ethyl-hexyl)-pthhalates, dibutyl phthalate, diethyl phthalate, dioctyl phthalate, butyl octyl phthalate, dicyclohexyl phthalate, butyl benzyl phthalate, dioctyl phthalate, diisononyl phthalate, and diisodecyl phthalate); adipates (e.g., di-(2-ethylhexyl)adipate, diisooctyl adipate, octyl decyladipate; and dioctyl adipate); alkyl azelates (e.g., di(2-ethylhexyl)azelate and di-(2-ethylbutyl)azelate); and dialkyl sebacates (e.g., dibutyl sebacate, dioctylsebacate, and diisooctyl sebacate). Other suitable plasticizers include phosphates such as triaryl phosphates (e.g., tricresyl phosphate, triphenyl phosphate, cresyl(liphenyl phosphate); trialkyl phosphates (e.g., trioctyl phosphate and tributyl phosphate); alkoxyalkyl phosphates (e.g., trisbutoxyethyl phosphate); and alkyl aryl phosphates (e.g., octyldiphenyl phosphate); citrates such as acetyl tri-n-butyl citrate, acetyl triethyl citrate, monoisopropyl citrate, triethyl citrate, mono-, di-, and tri-stearyl citrate; triacetin; p-tert-butyl; n-octyl benzoate; 2-ethylhexyl benzoate; isooctyl benzoate; n-nonyl benzoate; n-decyl benzoate; isodecyl benzoate; 2-propylheptyl benzoate; n-undecyl benzoate; isoundecyl benzoate; n-dodecyl benzoate; isododecyl benzoate; isotridecyl benzoate; n-tridecyl benzoate; triisononyl trimellitate; C13-rich $C_{11}$-$C_{14}$-alkyl benzoates, and combinations thereof. In some embodiments, plasticizers useful for practicing the present disclosure include esters, such as triethylene glycol bis (2-ethylhexanoate) commercially available under the trade designation "Eastman TEG-EH" from Eastman. In some embodiments, at least one of diethylene glycol monobenzoate, diethylene glycol dibenzoate, propylene glycol monobenzoate, propylene glycol dibenzoate, polypropylene glycol monobenzoate, polypropylene glycol dibenzoate can be used individually or in combination with any of the aforementioned plasticizers.

The amount of plasticizer employed, if one is employed, will depend on the nature of the polymeric resin and the plasticizer.

The water-vapor permeable polymer coating composition useful for practicing the present disclosure may comprise one or more organic solvents. Examples of suitable solvents include non-reactive compounds which may be aliphatic, aromatic, or araliphatic. Examples of suitable solvents include methoxypropyl acetate, methoxyethyl acetate, ethylene glycol diacetate, propylene glycol diacetate, glyme, diglyme, dioxane, tetrahydrofuran, dioxolane, tert-butyl methyl ether, ethyl acetate, butyl acetate, chloroform, methylene chloride, chlorobenzene, o-dichlorobenzene, anisole, 1,2-dimethoxybenzene, phenyl acetate, N-methyl-2-pyrrolidone, dimethylformamide, N,N-dimethylacetamide, dimethyl sulphoxide, acetonitrile, phenoxyethyl acetate, and combinations of two or more of these. In some embodiments, the solvent comprises at least one of methoxypropyl acetate, acetone, 2-butanone, xylene, toluene, cyclohexanone, 4-methyl-2-pentanone, 1-methoxyprop-2-yl acetate, ethylene glycol monomethyl ether, 3-methoxy-n-butyl acetate, white spirit, more highly substituted aromatics such as those commercially available, for example, under the trade designations "NAPTHA", "SOLVESSO", "ISOPAR", "NAPPAR" from Deutsche EXXON CHEMICAL GmbH, Cologne, Del.; "SHELLSOL" from Deutsche Shell Chemie GmbH, Eschborn, Del.; methyl n-amyl ketone ("MAK") and "AROMATIC 100" "AROMATIC 150" from ExxonMobile Chemical; xylene, methyl isobutyl ketone ("MIBK"), and ethyl 3-ethoxypropionate from Eastman Chemical Company.

Additional compositions useful for the water-vapor permeable polymer coating useful for practicing the present disclosure can be found in Int. Pat. Appl. Pub. Nos. WO 2015/126931 (Seabaugh et al.) and WO 2015/183354 (Widenbrant et al.), the examples of which are incorporated herein by reference.

The water-vapor permeable polymer coated inelastic porous layer forms a water-vapor permeable air and water barrier. Any suitable coating method may be useful for applying the polymer coating composition to the inelastic porous layer. For example, spray coating and gravure coating may be useful. In some embodiments, the polymer-coated inelastic porous layer has a moisture vapor transmission rate of at least 1 perm, at least 5 perms, or at least 10 perms.

In some embodiments, the polymer-coated inelastic porous layer has a water strike through time of not more than 180 seconds as measured by the evaluation method described in the examples, below. In some embodiments, the polymer-coated inelastic porous layer has a water strike through time of not more than 120 seconds, 100 seconds, 90 seconds, 60 seconds, 45 seconds, 30 seconds, or 20 seconds, as determined by the water strike through evaluation. In some embodiments, the polymer-coated inelastic porous layer has an absorbance capacity of at least one-half gram per 116 square centimeters as measured by the evaluation method described in the examples, below. In some embodiments, the air and water barrier article has an absorbance capacity of at least 0.75 gram, one gram, 1.25 grams, 1.5 grams, 1.75 grams, or 2 grams as measured by the water absorbance evaluation.

Various factors influence the ability of the air and water barrier article to have a water strike through time of not more than 180 seconds and a water absorbance capacity of at least one-half gram. For example, the material selection for the inelastic porous layer can influence these properties. When the inelastic porous layer has hydrophilic fibers, which are either made of hydrophilic materials (e.g., polyamide, polyester, rayon, or natural cellulose) or surface modified to provide a hydrophilic surface (e.g., with surfactant or other surface modification), the inelastic porous layer can dissipate water in the plane of the inelastic porous layer. Water dissipation can be carried out, for example, by capillary action or any other suitable mechanism. Another factor that can influence the water strike through time and water absorbance capacity of the air and water barrier article is the basis weight of the inelastic porous layer. A higher basis weight inelastic porous layer typically will have a higher water absorbance capacity and lower water strike through time. In some embodiments, the inelastic porous layer has a basis weight of at least 20 grams per square meter (gsm), 30 gsm, 40 gsm, 50 gsm, 60 gsm, 70 gsm, or 80 gsm. Another factor that can influence the water strike through time and water absorbance capacity is the composition of the polymer coating. A lower viscosity polymer coating can penetrate further into the inelastic porous layer than a higher viscosity polymer coating, leaving less of the inelastic porous layer available to absorb or dissipate water. Therefore, a higher viscosity polymer coating can be useful for decreasing water strike through time and increasing water absorbance capacity. The viscosity of the polymer coating can be influenced by the selection of polymer, the amount of plasticizers and lower molecular weight additives (e.g., adhesion promoters, water scavengers, and solvents), inorganic fillers, and rheology modifiers (e.g., fumed silica). In some embodiments, the polymer coating composition includes at least 0.25 percent, 0.3 percent, 0.4 percent, 0.5 percent, 2.5 percent, 3 percent, 4 percent, or 5 percent by weight fumed silica, based on the total weight of the polymeric coating composition.

A comparison of Illustrative Example 18 and Example 10, for example, shows that decreasing the amount of fumed silica in a polymeric coating composition by half increased the water strike through time by more than an order of magnitude when the inelastic porous layer was a nylon nonwoven with a basis weight of 33.9 grams per square meter.

The ability of the air and water barrier article according to the present disclosure to at least one of dissipate or absorb water can be useful, for example, when the air and water barrier article is subject to fastener penetration or another breach in which some water may leak into the air and water barrier article. In some cases, when samples that passed Modified Test 1 of ASTM D-1970/D-1970M-13, Modified Test 2 of ASTM D-1970/D-1970M-13, or Modified Test 3 of ASTM D-1970/D-1970M-13, as described in the examples below, were examined after evaluation, the red-colored water was observed to have penetrated into the inelastic porous in the area surrounding the fastener hole but not contacting the plywood substrate.

The air and water barrier articles according to the present disclosure comprise an adhesive, in some embodiments, a pressure sensitive adhesive (PSA), and are therefore generally considered to be self-adhering. PSAs are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired balance of tack, peel adhesion, and shear holding power.

A variety of pressure sensitive adhesives are useful for adhering air and water barrier articles to architectural structures (e.g., buildings) and building components, for example. These include both water vapor permeable and water vapor impermeable pressure sensitive adhesives. An example of the latter is a rubber modified asphalt (bitumen) pressure sensitive adhesive or a synthetic rubber pressure sensitive adhesive. Such pressure sensitive adhesives are known in the art and understood to be water vapor impermeable. Further examples of suitable PSAs include natural rubber-, acrylic-, block copolymer-, silicone-, polyisobutylene-, polyvinyl ether-, polybutadiene-, or and urea-based pressure sensitive adhesive and combinations thereof. These PSAs can be prepared, for example, as described in Adhesion and Adhesives Technology, Alphonsus V. Pocius, Hanser/Gardner Publications, Inc., Cincinnati, Ohio, 1997, pages 216 to 223, Handbook of Pressure Sensitive Adhesive Technology, Donatas Satas, 2nd Edition, Van Nostrand Reinhold, New York, N.Y., 1989, Chapter 15, and U.S. Pat. No. Re 24,906 (Ulrich).

In some embodiments, the adhesive is selected to be a solventless or hot melt adhesive. In some embodiments, solvent based adhesives or water based adhesives may be used. Examples of suitable adhesives include radiation-cured (e.g., ultraviolet (UV) radiation or electron-beam cured (co)polymers resulting from polymerizable monomers or oligomers) may be used. Suitable hot melt adhesives may contain (co)polymers such as butyl rubber, styrene-butadiene-styrene (SBS), styrene-isoprene-styrene (SIS), styrene butadiene (SB), styrene-ethylene-butadiene-styrene (SEBS), and ethylene/vinylacetate (EVA). Tackifying resins, which generally refer to materials that are compatible with the elastomer and have a number average molecular weight of up to 10,000 grams per mole, are typically added to these elastomers. Useful tackifying resins can have a softening point of at least 70° C. as determined using a ring and ball apparatus and a glass transition temperature of at least −30° C. as measured by differential scanning calorimetry. In some embodiments, the tackifying resin comprises at least one of rosin, a polyterpene (e.g., those based on α-pinene, β-pinene, or limonene), an aliphatic hydrocarbon resin (e.g., those based on cis- or trans-piperylene, isoprene, 2-methyl-but-2-ene, cyclopentadiene, dicyclopentadiene, or combinations thereof), an aromatic resin (e.g. those based on styrene, α-methyl styrene, methyl indene, indene, coumarone, or combinations thereof), or a mixed aliphatic-aromatic hydrocarbon resin. Any of these tackifying resins may be hydrogenated (e.g., partially or completely). Natural and petroleum waxes, oil, and bitumen may be useful as additives to the pressure sensitive adhesive composition.

In some embodiments, PSAs compositions that are useful in the air and water barrier article and method according to the present disclosure are acrylic PSAs. As used herein, the term "acrylic" or "acrylate" includes compounds having at least one of acrylic or methacrylic groups. Useful acrylic PSAs can be made, for example, by combining at least two different monomers. Examples of suitable first monomers include 2-methylbutyl acrylate, 2-ethylhexyl acrylate, isooctyl acrylate, lauryl acrylate, n-decyl acrylate, 4-methyl-2-pentyl acrylate, isoamyl acrylate, sec-butyl acrylate, isononyl acrylate, and methacrylates of the foregoing acrylates. Examples of suitable additional monomers useful for preparing acrylic PSAs include a (meth)acrylic acid (e.g., acrylic acid, methacrylic acid, itaconic acid, maleic acid, and fumaric acid), a (meth)acrylamide (e.g., acrylamide, methacrylamide, N-ethyl acrylamide, N-hydroxyethyl acrylamide, N-octyl acrylamide, N-t-butyl acrylamide, N,N-dimethyl acrylamide, N,N-diethyl acrylamide, N-ethyl-N-dihydroxyethyl acrylamide, and methacrylamides of the foregoing acrylamides), a (meth)acrylate (e.g., 2-hydroxyethyl acrylate or methacrylate, cyclohexyl acrylate, t-butyl acrylate, isobornyl acrylate, and methacrylates of the foregoing acrylates), N-vinyl pyrrolidone, N-vinyl caprolactam, an alpha-olefin, a vinyl ether, an allyl ether, a styrenic monomer, or a maleate. In some embodiments, the PSA in the composition according to the present disclosure includes a pendent carboxylic acid group incorporated into the PSA by including, for example, acrylic acid, methacrylic acid, itaconic acid, maleic acid, or fumaric acid in the preparation of the PSA.

Acrylic PSAs may also be made by including crosslinking agents in the formulation. Examples of cross-linking agents include copolymerizable polyfunctional ethylenically unsaturated monomers (e.g., 1,6-hexanediol diacrylate, trimethylolpropane triacrylate, pentaerythritol tetraacrylate, and 1,2-ethylene glycol diacrylate); ethylenically unsaturated compounds which in the excited state are capable of abstracting hydrogen (e.g., acrylated benzophenones as described in U.S. Pat. No. 4,737,559 (Kellen et al.), p-acryloxy-benzophenone, which is available from Sartomer Company, Exton, Pa., monomers described in U.S. Pat. No. 5,073,611 (Rehmer et al.) including p-N-(methacryloyl-4-oxapentamethylene)-carbamoyloxybenzophenone, N-(benzoyl-p-phenylene)-N'-(methacryloxymethylene)-carbodiimide, and p-acryloxy-benzophenone); nonionic crosslinking agents which are essentially free of olefinic unsaturation and is capable of reacting with carboxylic acid groups, for example, in the third monomer described above (e.g., 1,4-bis(ethyleneiminocarbonylamino)benzene; 4,4-bis(ethyleneiminocarbonylamino)diphenylmethane; 1,8-bis(ethyleneiminocarbonylamino)octane; 1,4-tolylene diisocyanate; 1,6-hexamethylene diisocyanate, N,N'-bis-1,2-propyleneisophthalamide, diepoxides, dianhydrides, bis(amides), and bis(imides)); and nonionic crosslinking agents which are essentially free of olefinic unsaturation, are noncopolymerizable with the first and second monomers, and, in the excited state, are capable of abstracting hydrogen (e.g., 2,4-bis(trichloromethyl)-6-(4-methoxy)phenyl)-s-triazine; 2,4-bis(trichloromethyl)-6-(3,4-dimethoxy)phenyl)-s-triazine; 2,4-bis(trichloromethyl)-6-(3,4,5-trimethoxy)phenyl)-s-triazine; 2,4-bis(trichloromethyl)-6-(2,4-dimethoxy)phenyl)-s-triazine; 2,4-bis(trichloromethyl)-6-(3-methoxy)phenyl)-s-triazine as described in U.S. Pat. No. 4,330,590 (Vesley); 2,4-bis(trichloromethyl)-6-naphthenyl-s-triazine and 2,4-bis(trichloromethyl)-6-(4-methoxy)naphthenyl-s-triazine as described in U.S. Pat. No. 4,329,384 (Vesley)).

Typically, the first monomer is used in an amount of 80-100 parts by weight (pbw) based on a total weight of 100 parts of copolymer, and an additional monomer as described above is used in an amount of 0-20 pbw based on a total weight of 100 parts of copolymer. The crosslinking agent can be used in an amount of 0.005 to 2 weight percent based on the combined weight of the monomers, for example from about 0.01 to about 0.5 percent by weight or from about 0.05 to 0.15 percent by weight.

The acrylic PSAs useful for practicing the present disclosure can be prepared, for example, in solvent or by a solvent free, bulk, free-radical polymerization process (e.g., using heat, electron-beam radiation, or ultraviolet radiation). Such polymerizations are typically facilitated by a polymerization initiator (e.g., a photoinitiator or a thermal initiator). The polymerization initiator is used in an amount effective to facilitate polymerization of the monomers (e.g., 0.1 part to about 5.0 parts or 0.2 part to about 1.0 part by weight, based on 100 parts of the total monomer content).

If a photocrosslinking agent is used, the coated adhesive can be exposed to ultraviolet radiation having a wavelength of about 250 nm to about 400 nm. The radiant energy in this range of wavelength required to crosslink the adhesive is about 100 millijoules/cm$^2$ to about 1,500 millijoules/cm$^2$, or more specifically, about 200 millijoules/cm$^2$ to about 800 millijoules/cm$^2$.

A useful solvent-free polymerization method is disclosed in U.S. Pat. No. 4,379,201 (Heilmann et al.). Initially, a mixture of first and additional monomers can be polymerized with a portion of a photoinitiator by exposing the mixture to UV radiation in an inert environment for a time sufficient to form a coatable base syrup, and subsequently adding a crosslinking agent and the remainder of the photoinitiator. This final syrup containing a crosslinking agent (e.g., which may have a Brookfield viscosity of about 100 centipoise to about 6000 centipoise at 23° C., as measured with a No. 4 LTV spindle, at 60 revolutions per minute) can then be coated onto a substrate, for example, a polymeric film substrate. Once the syrup is coated onto the substrate, for example, the polymeric film substrate, further polymerization and crosslinking can be carried out in an inert environment (e.g., nitrogen, carbon dioxide, helium, and argon, which exclude oxygen). A sufficiently inert atmosphere can be achieved by covering a layer of the photoactive syrup with a polymeric film, such as silicone-treated PET film, that is transparent to UV radiation or e-beam and irradiating through the film in air.

Solvent-based adhesives may contain ingredients such as those listed above, dissolved or dispersed in a solvent vehicle. Water based adhesives would normally be based on emulsions of (co)polymeric materials. Suitable (co)polymeric materials include vinyl acetate and (meth)acrylic homopolymers and copolymers. The phrase "(meth)acrylic homopolymers and copolymers" is typically used to mean homopolymers and copolymers of one or more (meth) acrylic esters (and acids) only, ethylene/vinyl acetate as well as styrene/acrylic, vinyl chloride/acrylic, vinyl versatate and others. Water based adhesives may have the disadvantage that they generally require the additional use of drying ovens or heat lamps to evaporate the water.

Methods and additives for making water vapor permeable adhesives are described, for example, in U.S. Pat. No. 5,198,064 (Tani et al.) and U.S. Pat. No. 9,562,174 (Russell) and U.S. Pat. Appl. Pub. No. 2015/0024159 (Bess).

If a water vapor permeable pressure sensitive adhesive is used, the air and water barrier article may be completely coated on one side. Accordingly, in some embodiments, the adhesive is provided as a continuous. In some embodiments, the adhesive (in some embodiments, pressure sensitive adhesive) useful for practicing the present disclosure is impermeable to water vapor. In some of these embodiments, to retain a desired level of water vapor permeance in the air and water barrier articles, the adhesive is applied to the air and water barrier article in a discontinuous manner in order to leave portions of the major outer surface of the air and water barrier article uncoated with adhesive. If a water vapor impermeable pressure sensitive adhesive is used, then the air and water barrier article is desirably only partially coated with adhesive, typically in the range of about 10% to 90%, more typically about 30% to 80%, most typically 40% to 70%, of the surface area of the article. In other words, at least 10% to 90%, in some embodiments 20% to 70% or 30% to 60%, of the surface area of the air and water barrier article is typically adhesive-free in order to maintain sufficient water vapor permeability of the article.

In order to prevent the lateral movement of air between the air and water barrier article and the substrate to which it is bonded, and through lap joints of the air and water barrier article, the adhesive coated areas of the air and water barrier article can be made to intersect to isolate the uncoated areas, thereby eliminating channels through which air can laterally move. This can be achieved by any number of patterns, such as intersecting circles with adhesive free centers, intersecting squares or rectangles of adhesive, intersecting strips in a checkered pattern, etc. In order to prevent any water that is contained in the inelastic porous layer from moving through the adhesive, in some embodiments, a continuous adhesive layer is beneficial.

Partial coatings of adhesive may be applied in a random fashion or in a specific pattern. Some examples of partial coatings of adhesive are described, for example, in U.S. Pat. No. 3,039,893 (Banigan, Jr.), U.S. Pat. No. 3,426,754 (Bierenbaum), U.S. Pat. No. 5,374,477 (Lawless), U.S. Pat. No. 5,593,771 (Lawless), U.S. Pat. No. 5,895,301 (Porter), U.S. Pat. No. 6,495,229 (Carte), and U.S. Pat. No. 6,901,712 (Lionel). In some embodiments, the adhesive is provided from dispensing outlets on a first distribution manifold and a second distribution manifold. The first distribution manifold can move while the second distribution manifold is kept stationary. Further details about this method can be found, for example, in Int. Pat. Appl. Pub. No. WO 2015/126645 (Maier et al.) and WO 2015/126931 (Seabaugh et al.), the disclosures of which are incorporated by reference in their entirety herein.

The adhesive may suitably be applied to the air and water barrier article at a thickness of 0.001 inches to 0.1 inch (about 0.0254-2.54 millimeters). In some embodiments, the pressure sensitive adhesive is applied at a thickness of 0.003 inches to 0.025 inches (about 0.0762-0.635 mm) or at a thickness of 0.005 inches to 0.02 inches (about 0.127-0.508 mm).

In some embodiments, air and water barrier articles according to the present disclosure include a liner. Various liners may be useful. In some embodiments, the liner comprises at least one of a polyester film, polyethylene film, polypropylene film, polyolefin coated polymer film, polyolefin coated paper, acrylic coated polymer film, and polymer coated kraft paper. The polyolefin coated film or paper may be polyethylene coated film or paper. Examples of suitable commercially available liners include those available under the trade designations "2.0 CL PET U4162/U4162" and "4 BU DHP UE1094B/000" from Loparex, Hammond, Wis. and a red pigmented, multilayer, thermoplastic olefin film containing a proprietary blend of high density polyethylene and low density polyethylene, having a thickness of about 63 micrometers (0.0025 inches), commercially available from Iso Poly Films, Incorporated, Gray Court, S.C.

Referring again to FIG. 2, the present disclosure provides an air and water barrier article 100 comprising in which substrate 125 is a liner. Such an article can be useful, for example, when the air and water barrier article is wound into a roll. In some embodiments, the liner 125 is coated on at least one of the major surfaces with a release coating. In some embodiments both major surfaces of the liner 125 are coated with a release coating. In this case, the release coating may the same or different on each of the major surfaces of the liner 125. Examples of materials useful as release coatings for the liners disclosed herein include acrylics, silicones, siloxanes, fluoropolymers, and urethanes. For example, in some embodiments, a liner useful in the roll according to the present disclosure is a polyolefin-coated polyester film with silicone treatment on one side, such as those commercially available under the trade designation "48# CL PET H/H UE1095/000" from Loparex, Hammond, Wis. In some embodiments, one side may have a silicone coating and the other an acrylic coating. A silicone coating may be useful for facilitating release of the pressure sensitive adhesive.

The liner may be produced using a variety of processing techniques. For example, liner processing techniques such as those disclosed in U.S. Pat. Appl. No. 2013/0059105 (Wright et al.) may be useful to produce a liner suitable for practicing the present disclosure. A suitable liner processing technique may include applying a layer comprising a (meth) acrylate-functional siloxane to a major surface of a substrate and irradiating that layer in a substantially inert atmosphere comprising no greater than 500 ppm oxygen with a short wavelength polychromatic ultraviolet light source having at least one peak intensity at a wavelength of from about 160 nanometers to about 240 nanometers. Irradiating can at least partially cure the layer. In some embodiments, the layer is cured at a curing temperature greater than 25° C. The layer may be at a temperature of at least 50° C., 60° C. 70° C., 80° C., 90° C., 100° C., 125° C., or at least 150° C., in some embodiments, no more than 250° C., 225° C., 200° C., 190° C., 180° C., 170° C., 160° C., or 155° C.

In many embodiments, the liner is impermeable to water vapor. In these embodiments, the liner is typically removed from the air and water barrier article when it is applied to a surface (e.g., a surface of a building component).

In some embodiments a peel adhesion between one major surface of the liner 125 and the adhesive surface 152 is less than or equal to a peel adhesion between the other major surface of the liner 125 and the surface 132 of the water-permeable polymer coating. In some embodiments, liner can be surface treated (e.g., at least on one major surface) to increase tack or adhesion between the liner and the polymeric coating 130. Examples of materials or surface treatments useful for increase tack or adhesion between the polymeric coating and the surface of the liner include any chemical or physical surface modifications to any of the polymeric coating, the surface of the liner, or both. For example, a chemical surface modifier can be used. In some embodiments, adhesion modification can be accomplished by selecting a specific liner surface morphology to increase surface area and physical interlocking of the polymeric coating.

In some embodiments of the air and water barrier article according to the present disclosure, the article includes at least one second coating composition disposed between at least a portion of the polymeric coating and the liner. The second coating composition(s) has a different peel adhesion to the liner than the polymeric coating. In some embodiments, the second coating composition has a first peel adhesion to the liner that is lower than a second peel adhesion between the polymeric composition and the liner. Therefore, in some embodiments, the second coating composition may be useful for reducing tack or adhesion between the polymeric material and the liner. In some embodiments, the second coating composition is not tacky and therefore would not be considered a PSA.

Useful second coating compositions include any of a variety of materials that are typically non-tacky and can be disposed between the polymeric composition and the liner. Examples of suitable second coating compositions include inks, release coatings, and slip coatings. In some embodiments, the second coating composition comprises at least one of a polyamide, a polyurethane, a silyl-terminated polyether, a vinyl polymer, an acrylic polymer, or a nitrocellulose polymer. A useful silyl-terminated polyether can be prepared as a polymeric material described above, for example, and increasing the amount of inorganic filler in the polymeric material can decrease its peel adhesion to the liner.

In some embodiments, the coating composition can be selected from commercially available materials. For example, useful coating compositions include a liquid, white ink available under the trade designation "DT OPAQUE WHITE" from Sun Chemical Corporation, Carlstadt, N.J., a liquid, red ink available under the trade designation "SUN-SPECTRO SB TRUWEATHER YS RED" from Sun Chemical Corporation, a vinyl, white ink available under the trade designation 13W1541 SOLVENT VINYLWHITE from Penn Color, Doylestown, Pa., a water-based ink dispersion of titanium dioxide and binder resin, available under the trade designation SPPFW1836936/G267 from Sun Chemical Corporation, a water-based polyurethane dispersion, available under the trade designation PERMAX 202 from The Lubrizol Corporation, Cleveland, Ohio, and a solvent-based polyamide primer, available under the trade designation POLYURETHANE PROTECTIVE TAPE ADHESION PROMOTER 86A from 3M Company, St. Paul, Minn.

Figure 5:
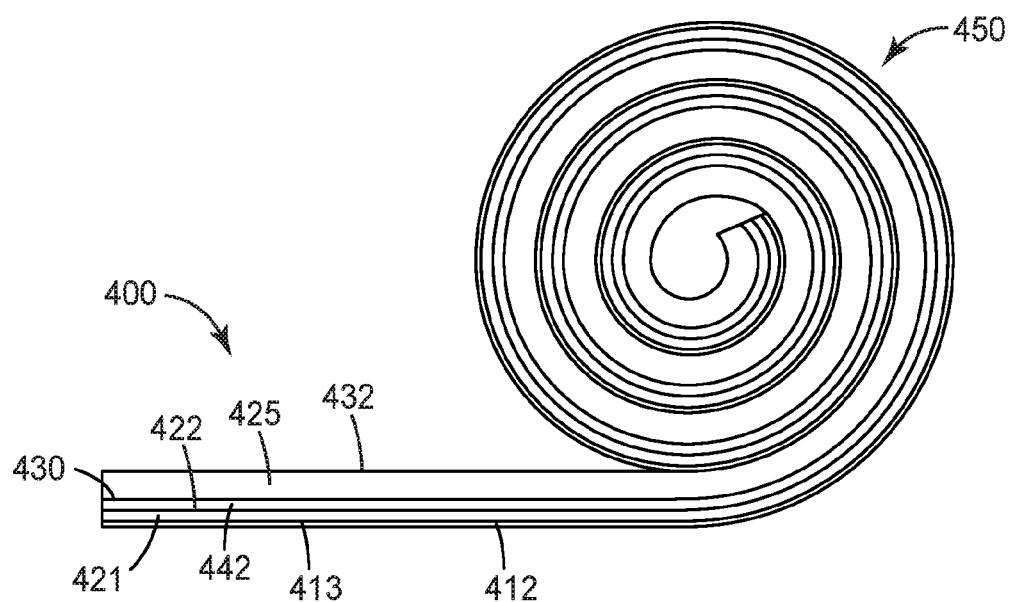
FIG. 5 is a side cross section view of an embodiment of a roll of an air and water barrier article according to the present disclosure.

Referring now to FIG. 5, the present disclosure provides polymer-coated inelastic porous layer 421 having opposing first and second major surfaces 422, 413, a pressure sensitive adhesive 412 disposed on at least the first major surface 413 of the polymer-coated inelastic porous layer 421, a coating composition 442 disposed on the second major surface 422 of the article 421, and a liner 425 having a first major surface 430 that contacts the coating composition 442. In this illustration the polymer coating and the inelastic porous layer are not shown as separate layers but are included in the polymer-coated inelastic porous layer 421. The pressure sensitive adhesive 412 contacts a second major surface 432 of the liner 425 when wound up in the roll. The coating composition 442 can have a first peel adhesion to the first major surface 430 of the liner 425 that is lower than a peel adhesion between the polymeric layer and the first major surface 430 of the liner 425. The peel adhesion between the second major surface 432 of the liner 425 and the pressure sensitive adhesive 412 is generally less than or equal to the peel adhesion between the first major surface 430 of the liner 425 and the second coating composition 442 on the polymer-coated inelastic porous layer 421.

FIG. 5 illustrates a roll wound with the pressure sensitive adhesive on the outside of the roll, which is useful for applying the roll to a building component since the roll does not have to first be unwound. In other embodiments, the roll may be wound with the pressure sensitive adhesive on the inside of the roll.

Figure 6:
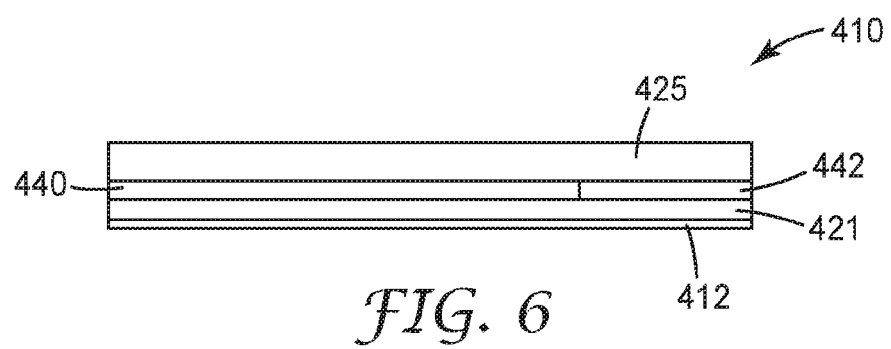
FIG. 6 is an end cross section view of an embodiment of a roll of an air and water barrier article according to the present disclosure having a second coating composition.

Referring now to FIG. 6, which is an end cross-section view of the roll 400, second coating compositions 440 and 442 are disposed between a portion of the liner 425 and the polymer-coated inelastic porous layer 421. Second coating compositions 440 and 442 can be positioned in various configurations and can have various widths relative to the air and water barrier article. If the second coating compositions 440 and 442 do not extend across the entire width of the air and water barrier article, the liner 425 and polymer-coated inelastic porous layer 421 can contact each other in the portion of the air and water barrier article that does not include a coating composition. In the illustrated embodiment, second coating composition 442 extends along one side of the article 410 in the machine direction and second coating composition 440 extends along the opposite side of the article 410 in the machine direction. In some embodiments, including the illustrated embodiment, the second coating compositions form continuous strips extending along the length of the roll. In some embodiments, the second coating composition is discontinuous.

The second coating composition(s) can influence the peel adhesion between the air and water barrier article and the liner. It may be useful to select second coating compositions 440 and 442 having different peel adhesions to the liner 425. The second coating composition with the lower peel adhesion 442 may be useful as an easy-to-peel tab to provide a location to initiate the removal of the liner.

Any suitable coating method may be useful for applying the second coating compositions to the polymer-coated inelastic porous layer and/or the liner. For example, spray coating and gravure coating may be useful.

In some embodiments, the presently disclosed air and water barrier article has a moisture vapor transmission rate of 1 perms or more according to ASTM E96 method. In some embodiments, the presently disclosed air and water barrier article has a moisture vapor transmission rate of 5 perms or more according to ASTM E96 method. In some embodiments, the article has a permeability of greater than 10 perms according to ASTM E 96. In some embodiments, thicknesses of the different layers used in the air and water barrier article are varied to achieve desired permeability of the article.

In some embodiments, the presently disclosed air and water barrier article is applied on an exterior sheathing layer, which is commonly plywood, oriented strand board (OSB), foam insulation sheathing, exterior grade gypsum sheathing board, or other conventional sheathing materials commonly used in the construction industry. Useful exterior cladding layer is made up of brick, concrete blocks, reinforced concrete, stone, vinyl siding, fiber cement board, clapboard, metal panels, or other known exterior siding materials. In some embodiments, the air and water barrier article is applied to a roofing deck, an attic floor or other attic surface, a boundary between a wall, roof system, and/or foundation, other interior or exterior surfaces of a structure, or used as flashing around a roof penetration.

Building components include panels and other constructions before, during, or after they become part of an architectural structure.

The air and water barrier article according to the present disclosure can be applied to a building component by adhering at least a portion of the adhesive on a roll of the air and water barrier article in any of the above embodiments to a surface of a building component, so that the air and water barrier article is affixed to the surface of the building component. When the roll is unwound, the liner can release from the adhesive and remain adhered to the polymer-coated inelastic porous layer and/or the second coating composition(s) on the air and water barrier article. Adhering the roll to the building component can be carried out before or after the roll is unwound. In some embodiments, the roll is conveniently adhered to the building component before it is unwound. In some embodiments, the roll is at least partially unwound before it is adhered to the building component, for example, in embodiments in which the roll is wound with the pressure sensitive adhesive on the inside of the roll.

Next the liner can be peeled away from the air and water barrier article. Peeling the liner away from the air and water barrier article is optional and depends on whether a water vapor permeable liner is used and whether water vapor permeability is desired.

The air and water barrier article according to the present disclosure can have a wide variety of widths. In some embodiments, the width of the article is at least 1.9 centimeters or at least 2.5 centimeters. In some embodiments, the width of the article is at least 5 centimeters or at least 10 centimeters. In some embodiments, the width of the article is at most 10 centimeters. In some embodiments, the width of the article is up to 45 centimeters or up to 75 centimeters. In some embodiments, the width of the article is up to 75 centimeters or up to 150 centimeters.

Some embodiments of the present disclosure.

In a first embodiment, the present disclosure provides an air and water barrier article comprising:

a polymer-coated inelastic porous layer comprising a water-vapor permeable polymeric coating disposed on at least one major surface of the inelastic porous layer, wherein the inelastic porous layer comprises at least one of surface-modified fibers or natural cellulose fibers; and an adhesive disposed on a major surface of the polymer-coated inelastic porous layer, wherein the adhesive is exposed, in contact with a release surface, or adhered to a surface of a building component.

In a second embodiment, the present disclosure provides the air and water barrier article of the first embodiment, wherein the polymer-coated inelastic porous layer has a water strike through time of not more than 180 seconds.

In a third embodiment, the present disclosure provides the air and water barrier article of the first or second embodiment, wherein the air and water barrier article has an absorbance capacity of at least one-half gram per 116 square centimeters.

In a fourth embodiment, the present disclosure provides an air and water barrier article comprising:

a polymer-coated inelastic porous layer comprising a water-vapor permeable polymeric coating disposed on at least one major surface of the inelastic porous layer; and an adhesive disposed on a major surface of the polymer-coated inelastic porous layer, wherein the adhesive is exposed, in contact with a release surface, or adhered to a surface of a building component, and wherein the polymer-coated inelastic porous layer has a water strike through time of not more than 180 seconds.

In a fifth embodiment, the present disclosure provides the air and water barrier article of the fourth embodiment, wherein the air and water barrier article has an absorbance capacity of at least one-half gram per 116 square centimeters.

In a sixth embodiment, the present disclosure provides an air and water barrier article comprising:

a polymer-coated inelastic porous layer comprising a water-vapor permeable polymeric coating disposed on at least one major surface of the inelastic porous layer; and an adhesive disposed on a major surface of the polymer-coated inelastic porous layer, wherein the adhesive is exposed, in contact with a release surface, or adhered to a surface of a building component, and wherein the air and water barrier article has an absorbance capacity of at least one-half gram per 116 square centimeters.

In a seventh embodiment, the present disclosure provides the air and water barrier article of the sixth embodiment, wherein the polymer-coated inelastic porous layer has a water strike through time of not more than 180 seconds.

In an eighth embodiment, the present disclosure provides the air and water barrier article of any one of the first to seventh embodiments, wherein the inelastic porous layer comprises the surface-modified fibers.

In a ninth embodiment, the present disclosure provides the air and water barrier article of any one of the first to eighth embodiments, wherein the water-vapor permeable polymeric coating at least partially impregnates the inelastic porous layer.

In a tenth embodiment, the present disclosure provides the air and water barrier article of any one of the first to ninth embodiments, wherein the water-vapor permeable polymeric coating is continuous.

In an eleventh embodiment, the present disclosure provides the air and water barrier article of any one of the first to tenth embodiments, wherein the water-vapor permeable polymeric coating is crosslinked.

In a twelfth embodiment, the present disclosure provides the air and water barrier article of any one of the first to eleventh embodiments, wherein the water-vapor permeable polymeric coating is disposed on only one major surface of the inelastic porous layer.

In a thirteenth embodiment, the present disclosure provides the air and water barrier article of any one of the first to eleventh embodiments, wherein the water-vapor permeable polymeric coating is disposed on both major surfaces of the inelastic porous layer.

In a fourteenth embodiment, the present disclosure provides the air and water barrier article of any one of the first to thirteenth embodiments, wherein the polymeric layer comprises a polyoxyalkylene polymer having at least one crosslink site derived from an alkoxy silane.

In a fifteenth embodiment, the present disclosure provides the air and water barrier article of the fourteenth embodiment, wherein the water-permeable polymer coating is derived from polyoxyalkylene polymer in which all of the end groups are silyl terminated.

In a sixteenth embodiment, the present disclosure provides the air and water barrier article of the fifteenth embodiment, wherein the polyoxyalkylene polymer further comprises at least one silyl modified branched group.

In a seventeenth embodiment, the present disclosure provides the air and water barrier article of any one of the first to sixteenth embodiments, wherein the air and water barrier article passes Modified Test 1 of ASTM D-1970/D-1970M-13, Modified Test 2 of ASTM D-1970/D-1970M-13, or Modified Test 3 of ASTM D-1970/D-1970M-13.

In an eighteenth embodiment, the present disclosure provides the air and water barrier article of any one of the first to seventeenth embodiments, wherein the polymer-coated inelastic porous layer has a vapor transmission rate of greater than or equal to 1 perm.

In a nineteenth embodiment, the present disclosure provides the air and water barrier article of any one of the first to eighteenth embodiments, wherein the adhesive is continuously disposed on the major surface of the polymer-coated inelastic porous layer.

In a twentieth embodiment, the present disclosure provides the air and water barrier article of any one of the first to eighteenth embodiments, wherein the adhesive is discontinuously disposed on the major surface of the polymer-coated inelastic porous layer.

In a twenty-first embodiment, the present disclosure provides the air and water barrier article of any one of the first to twentieth embodiments, wherein the adhesive is a pressure sensitive adhesive.

In a twenty-second embodiment, the present disclosure provides the air and water barrier article of any one of the first to twenty-first embodiments, wherein the inelastic porous layer comprises at least one of polyester, surface-modified polyester, polylactic acid, surface-modified polyolefin, polyamide, or rayon.

In a twenty-third embodiment, the present disclosure provides the air and water barrier article of any one of the first to twenty-second embodiments, wherein the inelastic porous layer comprises at least one of a netting, a scrim, a nonwoven fabric, a woven fabric, or a knitted fabric.

In a twenty-fourth embodiment, the present disclosure provides the air and water barrier article of the twenty-third embodiment, wherein the inelastic porous layer comprises a nonwoven fabric.

In a twenty-fifth embodiment, the present disclosure provides the air and water barrier article of any one of the first to twenty-fourth embodiments, wherein the inelastic layer has an elongation of less than 90%.

In a twenty-sixth embodiment, the present disclosure provides the air and water barrier article of any one of the first to twenty-fifth embodiments, wherein the inelastic porous layer can dissipate water in the plane of the inelastic porous layer.

In a twenty-seventh embodiment, the present disclosure provides the air and water barrier article of any one of the first to twenty-sixth embodiments, wherein the adhesive is exposed.

In a twenty-eighth embodiment, the present disclosure provides the air and water barrier article of any one of the first to twenty-sixth embodiments, wherein the air and water barrier article is in the form of a roll, and wherein in the roll, the adhesive is in contact with the release surface.

In a twenty-ninth embodiment, the present disclosure provides the air and water barrier article of any one of the first to twenty-eighth embodiments, further comprising a liner disposed on the polymer-coated inelastic porous layer.

In a thirtieth embodiment, the present disclosure provides the air and water barrier article of the twenty-ninth embodiment, further comprising at least one second coating composition between a first major surface of the liner and the polymer-coated inelastic porous layer.

In a thirty-first embodiment, the present disclosure provides the air and water barrier article of the twenty-ninth or thirtieth embodiment, wherein a second major surface of the liner comprises the release surface, and wherein the adhesive is in contact with the release surface when the air and water barrier article is wound into a roll.

In a thirty-second embodiment, the present disclosure provides the air and water barrier article of any one of the first to twenty-sixth and twenty-eighth to thirty-first embodiments, wherein the adhesive is adhered to the surface of the building component.

In a thirty-third embodiment, the present disclosure provides a building component having a surface adhered to the air and water barrier article of the thirty-second embodiment.

In a thirty-fourth embodiment, the present disclosure provides a method of applying an air and water barrier article, the method comprising:

adhering at least a portion of the adhesive on a roll of the air and water barrier article of any one of the twenty-ninth to thirty-first embodiments to the surface of the building component, so that the air and water barrier article is affixed to the surface of the building component; and unwinding at least a portion of the roll, wherein during the unwinding, the liner remains disposed on the polymer-coated inelastic porous layer.

In a thirty-fifth embodiment, the present disclosure provides the method of the thirty-fourth embodiment, further comprising removing the liner from the polymer-coated inelastic porous layer.

Embodiments of the present disclosure have been described above and are further illustrated below by way of the following Examples, which are not to be construed in any way as imposing limitations upon the scope of the present disclosure. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

The following examples are intended to illustrate exemplary embodiments within the scope of this disclosure.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

| MATERIALS | |
| --- | --- |
| KANEKA MS POLYMER S203H | A liquid, silyl-terminated polyether derived from a polyether polymer backbone and having methyldimethoxysilane functional groups and a viscosity of 6000 to 10,000 centiPoise, available under the trade designation KANEKA MS POLYMER S203H from Kaneka North America, LLC, Pasadena, TX. |
| AEROSIL R202 | A hydrophobic fumed silica after treated with a polydimethylsiloxane, available under the trade designation AEROSIL R202 from Evonik Corporation, Parsippany, NJ. |
| OMYACARB 5-FL | A beneficiated calcium carbonate having a mean particle size of 6.3 micrometers and a calcium carbonate content of 98%, available under the trade designation OMYACARB 5-FL from Omya Incorporated, Cincinnati, OH. |
| TIONA 696 | A non-chalking, chlorie-process rutile titanium dioxide pigment having a titanium dioxide content of 92%, and a surface treatment of alumina, silica, organic, available under the trade designation TIONA 696 from Cristal, Hunt Valley, MD. |
| DYNASYLAN DAMO-T | A liquid, bifunctional organosilane having two reactive amino groups and hydrolyzable inorganic methoxysilyl groups, available under the trade designation DYNASYLAN DAMO-T from Evonik Corporation, Parsippany, NJ. |
| DYNASYLAN VTMO | A liquid, bifunctional organosilane having a reactive vinyl group and a hydrolyzable inorganic trimethoxysilyl group, available under the trade designation DYNASYLAN VTMO from Evonik Corporation, Parsippany, NJ. |
| NEOSTAN U-220H | A liquid catalyst based on dibutyl tin bis(acetylacetoacetonate) having a tin content of 27.5%, available under the trade designation NEOSTAN U-220H from Nitto Kasei Company, Ltd., Osaka, Japan. |
| REEMAY 2024 | A spunbond polyester fabric having an areal weight of 71.4 grams/square meter, a thickness of 0.31 millimeters, and a TEXTEST Air Perm of (1626 liters/second)/square meter (320 cubic feet/minute)/square foot), available under the trade designation REEMAY 2024 from Fiberweb Filtration Business, Old Hickory, TN. |
| INELASTIC POROUS LAYER 1 | A hydrophilic spunbond polypropylene nonwoven having a basis weight of 42.4 grams/square meter. This material is available under the trade designation Unipro 125W from Midwest Filtration LLC, Cincinnati, OH. |
| INELASTIC POROUS LAYER 2 | A wet-laid nonwoven containing a blend of polyester and cellulose fibers and having a basis weight of 57.0 grams/square meter. This material is available under the trade designation Uniblend 180 from Midwest Filtration LLC, Cincinnati, OH. |
| INELASTIC POROUS LAYER 3 | A spunbond polyester nonwoven fabric having a fabric weight of 80 grams/square meter, available as Type 062 Grey from Freudenberg Performance Materials LP, Durham, NC. |
| INELASTIC POROUS LAYER 4 | A meltblown nonwoven having a basis weight of 67.8 grams/square meter available as 2.0 oz/sq. yd Wettable KIMTEX ® MB from Kimberly Clark Corporation, Irving, TX. |
| INELASTIC POROUS LAYER 5 | A meltblown nonwoven having a basis weight of 33.9 grams/square meter available as 1.0 oz/sq. yd ERHT MB from Kimberly Clark Corporation, Irving, TX. |
| INELASTIC POROUS LAYER 6 | A dry-laid nonwoven containing 80% rayon and 20% polyester fibers and having a basis weight of 59.3 grams/square meter. This material is available under the trade designation Unifil 175 from Midwest Filtration LLC, Cincinnati, OH. |
| INELASTIC POROUS LAYER 7 | A spunlace non wo ven containing 55% woodpulp and 45% polyester and having a basis weight of 67.8 grams/square meter. This material is available under the trade designation Unispun 200 from Midwest Filtration LLC, Cincinnati, OH. |
| INELASTIC POROUS LAYER 8 | An absorbent material which, according to its technical data sheet, contains 61.8% Pulp (pulp fluff 40.6%, tissue 21.2%) and 38.2% of a "Super absorber", and has a total basis weight of 170 grams/square meter, a single ply caliper of 1.15 millimeters, a machine direction tensile strength (dry) of 2.00 pounds force, a machine direction tensile strength of 17%, and a "Freeswell Absorption (0.9% Saline) of 16.25 |

-continued

| MATERIALS | |
|---|---|
| | grams/gram material, available under the trade designation SUPERCORE T-172-S from McAirlaid's Incorporated, Rocky Mount, VA. |
| INELASTIC POROUS LAYER 9 | A white thermally bonded nylon nonwoven with a basis weight of 23.7 grams/square meter, available under the trade designation PBN-II 70 from Midwest Filtration LLC, Cincinnati, OH. |
| INELASTIC POROUS LAYER 10 | A white thermally bonded nylon nonwoven with a basis weight of 33.9 grams/square meter, available under the trade designation PBN-II 100 from Midwest Filtration LLC, Cincinnati, OH. |
| INELASTIC POROUS LAYER 11 | A white thermally bonded nylon nonwoven with a basis weight of 50.9 grams/square meter, available under the trade designation PBN-II 150 from Midwest Filtration LLC, Cincinnati, OH. |
| INELASTIC POROUS LAYER 12 | A white thermally bonded nylon nonwoven with a basis weight of 67.8 grams/square meter, available under the trade designation PBN-II 200 from Midwest Filtration LLC, Cincinnati, OH. |
| INELASTIC POROUS LAYER 13 | A blue spunbond polypropylene nonwoven with a basis weight of 50.5 gsm. This material is available as 50.5 gsm Blue SBPP from First Quality Enterprises, Great Neck, NY) |
| INELASTIC POROUS LAYER 14 | A spunlace nonwoven containing rayon and polyester fibers and having a basis weight of 45 grams/square meter. This material is available as 700-00718 from Precision Fabrics Group, Inc. Greensboro, NC. |
| Unipro 125 | A spunbond polypropylene nonwoven having a basis weight of 42.4 grams/square meter, available under the trade designation Unipro 125 from Midwest Filtration LLC Cincinnati, OH. |
| Ink 1 | A liquid, white ink, available under the trade designation DT OPAQUE WHITE from Sun Chemical Corporation, Carlstadt, NJ. |
| GENIOSIL XL 65 | A liquid, alkoxysilane having an O-methyl carbamate organofunctional group, N-Dimethoxy(methyl)silylmethyl-O-methyl-carbamate, having utility as a water scavenging compound, available under the trade designation GENIOSIL XL 65 from Wacker Chemie AG, Munchen, Germany. |
| LINER 1 | A 77 micrometers (0.003 inches) thick, polyolefin-coated polyester core with silicone treatment on one side, available under the trade designation 48# CL PET H/H UE1095/000 from Loparex, Hammond, WI. |
| LINER 2 | A 51 micrometer (0.002 inch) thick, polyester film having a silicone treatment on both sides, available as 2.0 CL PET U4162/U4162 from Loparex, Hammond, WI. |

Test Methods

Elongation

Tensile properties of coated air barrier articles were evaluated generally as described in ASTM D882-12: "Standard Test Method for Tensile Properties of Thin Plastic Sheeting" with the following modifications. Three straight section specimens measuring 12.5 mm (0.5 inches) wide, 152 millimeters (6 inches) long, and having a thickness generally between approximately 0.15 and 0.76 millimeters (0.006 to 0.030 inches) were cut from film samples in the downweb (DW; also referred to as the machine direction (MD)) and crossweb (CW) directions and conditioned for a minimum of 24 hours at 23+/−2° C. and 50% relative humidity +/−5% prior to testing. The separation distance between parallel grips was 100 mm (4 inches), the crosshead speed was 51 millimeters/minute (2 inches/minute). The separation rate, force measurements, and data calculations were carried out by the system controller. The average of two test samples was reported. The elongation to break is reported in Table 3, below.

Water Strike Through

The moisture dissipation capability of the polymer coated porous layer was characterized according to WSP 70.3 (08)—"Standard Test Method for Nonwoven Coverstock Liquid Strike-Through Time Using Simulated Urine" with the following modifications. No absorbent pad was put under the test specimen. The samples were all tested on the porous layer opposite the polymeric coating. Instead of using 5 mL of simulated urine, 3 milliliters of distilled water was used. A plate measuring 101.6 millimeters (4 inches)× 101.6 millimeters (4 inches)×25.4 millimeters (1 inch) thick was placed on top of the specimen. The water was placed into a cylinder cut through the plate with a diameter of 25.4 millimeter (1 inch). A stopwatch was used instead of an electronic timer. The stopwatch was started as soon as the water contacted the porous layer, and was stopped once the water had completely penetrated into the porous layer. The time for the 3 milliliters of water to completely penetrate into the porous layer was recorded in seconds and reported as the Strike Through Time of the polymeric coated porous layer.

Water Absorption Capacity

The absorption capacity of the polymer coated porous layer was determined as follows. A 107.95 millimeters (4.25 inches)×107.95 millimeters (4.25 inches) sample was weighed and then placed in to a bath of water for 5 minutes. The material was then taken out of the bath and hung by a clip for 1 minute. The material was then reweighed to determine the weight of the water absorbed in grams. The Water Absorbance Capacity was calculated by subtracting the initial weight of the material from the final weight after soaking. The absorption values were reported in grams Nail Sealability Nail sealability of air and water barrier articles was evaluated generally as described in ASTM D-1970/D-1970M-13: "Standard Specification for Self-Adhering Polymer Modified Bituminous Sheet Materials Used as Steep Roofing Underlayment for Ice Dam Protection", Paragraph 7.9: "Self Sealability. Head of Water Test" with some modifications. All materials were conditioned at (23° C. (73° F.)) for at least 24 hours prior to use. Three different modified tests were employed. Samples were considered to have passed the test if a rating of "A" or "B" was achieved.

Modified Test 1 of ASTM D-1970/D-1970M-13

A plywood substrate having a thickness of 1.25 cm (0.5 inches) was employed; four nails were driven through the air and water barrier article into the plywood substrate until 6.35 millimeters (0.25 inches) remained above the exposed surface of the air and water barrier article; and a red dye was added to the water. After exposure the surface of plywood substrate in contact with the air and water barrier article (referred to herein as the "topside"), and the surface of the plywood substrate opposite the topside (referred to herein as the "bottomside") were inspected visually by unaided eye for signs of water leakage as determined by the presence of red-stained areas around each of the four nails. Such stained areas would be indicative of failure of the air and water barrier article to form a seal around the nails. Samples were rated "A" if 3 or 4 of the nail areas on the plywood substrate were free of dye staining; "B" if 2 of the nail areas on the plywood substrate were free of dye staining; and "C" if 1 or 0 of the nail areas on the plywood substrate were free of dye staining.

Modified Test 2 of ASTM D-1970/D-1970M-13

Modified Test 2 was conducted in the same manner as Modified Test 1 with the following change. The four nails were driven through the air barrier article into the plywood substrate until the nail head contacted the top surface of the air and water barrier article, then the nail was backed out until 6.35 millimeters (0.25 inches) remained above the exposed surface of the air and water barrier article.

Modified Test 3 of ASTM D-1970/D-1970M-13

Modified Test 3 was conducted in the same manner as Modified Test 2 with the following modification. The nails were not backed out.

Moisture Vapor Transmission Rate

The moisture vapor transmission rates of air and water barrier articles were evaluated generally as described in ASTM E96/E96M-13: "Standard Test Methods for Water Vapor Transmission of Materials" using Paragraph 11: Desiccant Method at (23° C. (73° F.)) and 50% relative humidity, with the following modifications. Six data points were obtained and used to calculate a permeance value. The six individual values were used to determine an average permeance value which was reported in units of Perms.

Example 1

An air and water barrier article having an inelastic porous layer partially impregnated and covered on one side with a polymeric coating was prepared as follows. LINER 1 was provided with a flood coating of INK 1 on one side using a #0 Meyer bar followed by drying at room temperature to provide 100% ink coverage of the liner. The polymeric material composition was provided by charging the following materials into a mixing vessel which was then placed in a dual asymmetric centrifuge mixer: 39.8 parts by weight (hereinafter abbreviated as "pbw") of a silyl-terminated polyether, KANEKA MS POLYMER 5203H, 2.5 pbw of hydrophobic fumed silica, AEROSIL R202, 26.7 pbw of calcium carbonate OMYACARB 5-FL, and 4.4 pbw of titanium oxide, TIONA 696. After mixing at 2500 rpm for four minutes 0.87 pbw of an aminosilane, DYNASYLAN DAMO-T, 0.87 pbw of a vinyl trimethoxysilane, DYNASYLAN VTMO, and 0.19 pbw of a tin catalyst, NEOSTANN U-220H, were added and mixed at 2500 rpm for two minutes. This final mixture was used to coat on top of INK 1 on LINER 1 using a notch bar coater having a gap setting that was 0.30 millimeters (0.012 inches) greater than the thickness of the release film. The polymeric material-coated release liner was then laminated to INELASTIC POROUS LAYER 1, at room temperature (23° C. (73° F.)) using a hand roller and light pressure. This laminate construction was cured at 93° C. (200° F.) for 8 hours. This gave an air and water barrier article (continuous layer of polymeric material on one side of the inelastic porous layer) having a liner on the side of the polymeric coating opposite that of the inelastic porous layer.

This article was tested for Water Strike Through and Water Absorption Capacity after Liner 1 (including Ink 1) was removed.

Example 2

Example 1 was repeated with the following modifications. INELASTIC POROUS LAYER 2 was used in place of INELASTIC POROUS LAYER 1.

Example 3

Example 1 was repeated with the following modifications. INELASTIC POROUS LAYER 3 was used in place of INELASTIC POROUS LAYER 1.

Example 4

Example 1 was repeated with the following modifications. INELASTIC POROUS LAYER 4 was used in place of INELASTIC POROUS LAYER 1.

Example 5

Example 1 was repeated with the following modifications. INELASTIC POROUS LAYER 5 was used in place of INELASTIC POROUS LAYER 1.

Illustrative Example 6

Example 1 was repeated with the following modifications. INELASTIC POROUS LAYER 6 was used in place of INELASTIC POROUS LAYER 1.

Example 7

Illustrative Example 6 was repeated with the following modifications. 5 pbw of hydrophobic fumed silica, AEROSIL R202 were used instead of 2.5 pbw in the polymeric formulation.

Example 8

Example 1 was repeated with the following modifications. INELASTIC POROUS LAYER 7 was used in place of INELASTIC POROUS LAYER 1.

Example 9

Example 1 was repeated with the following modifications. INELASTIC POROUS LAYER 8 was used in place of INELASTIC POROUS LAYER 1.

Example 10

Example 1 was repeated with the following modifications. INELASTIC POROUS LAYER 9 was used in place of INELASTIC POROUS LAYER 1.

Example 11

Example 1 was repeated with the following modifications. INELASTIC POROUS LAYER 10 was used in place of INELASTIC POROUS LAYER 1.

Example 12

Example 1 was repeated with the following modifications. INELASTIC POROUS LAYER 11 was used in place of INELASTIC POROUS LAYER 1.

Example 13

Example 1 was repeated with the following modifications. INELASTIC POROUS LAYER 12 was used in place of INELASTIC POROUS LAYER 1.

Example 14

Example 1 was repeated with the following modifications. INELASTIC POROUS LAYER 13 was used in place of INELASTIC POROUS LAYER 1.

Illustrative Example 15

Example 1 was repeated with the following modifications. INELASTIC POROUS LAYER 14 was used in place of INELASTIC POROUS LAYER 1.

Example 16

Illustrative Example 15 was repeated with the following modifications. 3.75 pbw of hydrophobic fumed silica, AEROSIL R202 were used instead of 2.5 pbw in the polymeric formulation.

Example 17

Example 10 was repeated with the following modifications. Only 1.25 pbw of hydrophobic fumed silica, AEROSIL R202 was used when formulating the polymeric composition.

Illustrative Example 18

Example 11 was repeated with the following modifications. Only 1.25 pbw of hydrophobic fumed silica, AEROSIL R202 was used when formulating the polymeric composition.

Illustrative Example 19

Example 12 was repeated with the following modifications. Only 1.25 pbw of hydrophobic fumed silica, AEROSIL R202 was used when formulating the polymeric composition.

Illustrative Example 20

Example 13 was repeated with the following modifications. Only 1.25 pbw of hydrophobic fumed silica, AEROSIL R202 was used when formulating the polymeric composition.

Any of these Examples can be coated with an adhesive.

Comparative Example 1

Example 1 was repeated with the following modifications. A porous layer (REEMAY 2024) was used in place of INELASTIC POROUS LAYER 1. LINER 2 was used in place of LINER 1, and it was not coated with INK 1 prior to the polymeric coating.

Comparative Example 2

Example 1 was repeated with the following modifications. A porous layer (Unipro 125) was used in place of INELASTIC POROUS LAYER 1.

TABLE 1

Water Strike Through & Absorption Capacity

| Ex. No. | Strike Through Time(seconds) | Initial Weight (grams) | Final Weight (grams) | Absorbance Capacity (grams) |
|---|---|---|---|---|
| 1 | 8.2 | 5.6366 | 7.6938 | 2.0572 |
| 2 | 8.2 | 5.5905 | 7.6041 | 2.0136 |
| 3 | 4.19 | 4.075 | 5.5681 | 1.4931 |
| 4 | 18.69 | ND | ND | ND |
| 5 | 3.71 | ND | ND | ND |
| I.E. 6 | 183.3 | 5.1651 | 6.5952 | 1.4301 |
| 7 | 162 | 3.6129 | 5.7517 | 2.1388 |
| 8 | 27.2 | 5.6083 | 8.155 | 2.5467 |
| 9 | 3.57 | 9.4666 | 68.6154 | 59.1488 |
| 10 | 40.19 | 5.4596 | 6.13 | 0.6704 |
| 11 | 94.5 | 5.5995 | 6.5519 | 0.9524 |
| 12 | 135.6 | 5.5119 | 6.7121 | 1.2002 |
| 13 | 74.4 | 5.9326 | 7.6056 | 1.673 |
| 14 | 34.7 | 3.2671 | 5.2768 | 2.0097 |
| I.E. 15 | 318 | ND | ND | ND |
| 16 | 2.72 | 12.4058 | 14.9873 | 4.3714 |
| 17 | 176 | ND | ND | ND |
| I.E. 18 | 534 | ND | ND | ND |
| I.E. 19 | 762 | ND | ND | ND |
| I.E. 20 | 576 | ND | ND | ND |
| CE 1 | 3300 | 3.9083 | 4.1999 | 0.2916 |
| CE 2 | Over 15 hours | 4.3602 | 4.5626 | 0.2024 |

I.E.: Illustrative Example
ND: Not Determined

TABLE 2

Nail Sealability (Test 1) and Moisture Vapor Transmission Rate

| Ex. No. | Nail Sealability | | Moisture Vapor Transmission Rate Permeance (Perms) |
|---|---|---|---|
| | Top Side Test 1 | Bottom Side Test 1 | |
| 1 | A | A | 20.88 |
| 2 | ND | ND | 20.88 |

TABLE 2-continued

Nail Sealability (Test 1) and Moisture Vapor Transmission Rate

| Ex. No. | Nail Sealability Top Side Test 1 | Nail Sealability Bottom Side Test 1 | Moisture Vapor Transmission Rate Permeance (Perms) |
|---|---|---|---|
| 3 | A | A | ND |
| IE 6 | ND | ND | 22.84 |
| 8 | ND | ND | 20.98 |
| 9 | ND | ND | 33.99 |
| 13 | ND | ND | 18.79 |

IE: Illustrative Example
ND: Not Determined

TABLE 3

Elongation

| Ex. No. | Elongation - CD (%) | Elongation - MD (%) |
|---|---|---|
| 1 | 55.01 | 52.14 |
| 2 | 12.14 | 10.36 |
| IE 6 | 44.28 | 12.80 |
| 8 | 98.67* | 32.01 |
| 9 | 67.42 | 16.27 |
| 13 | 78.50 | 66.54 |

IE: Illustrative Example
*The measurement showed a break in the material before 90% elongation, and it is believed that the polymeric coating continued to stretch until 98.67% elongation.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. Furthermore, all published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following listing of disclosed embodiments.

What is claimed is:

1. An air and water barrier article comprising:
 a polymer-coated inelastic porous layer comprising:
  an inelastic porous layer; and
  a polymeric coating disposed on at least one major surface of the inelastic porous layer, wherein the polymeric coating is water vapor permeable; and
 an adhesive disposed on a major surface of the polymer-coated inelastic porous layer on either the polymeric coating or on a major surface of the inelastic porous layer opposite the polymeric coating,
wherein the adhesive is exposed or adhered to a surface of a building component, and wherein the polymer-coated inelastic porous layer has a water strike through time of not more than 180 seconds.

2. An air and water barrier article comprising:
 a polymer-coated inelastic porous layer comprising:
  an inelastic porous layer; and
  a polymeric coating disposed on at least one major surface of the inelastic porous layer, wherein the polymeric coating is water vapor permeable; and
 an adhesive disposed on a major surface of the polymer-coated inelastic porous layer on either the polymeric coating or on a major surface of the inelastic porous layer opposite the polymeric coating,
wherein the adhesive is exposed, in contact with a release surface, or adhered to a surface of a building component, and wherein the polymer-coated inelastic porous layer has a water absorption capacity of at least one-half gram per 116 square centimeters.

3. The air and water barrier article of claim 1, wherein the polymeric coating at least partially impregnates the inelastic porous layer.

4. The air and water barrier article of claim 1, wherein the polymeric coating is continuous.

5. The air and water barrier article of claim 1, wherein the polymeric coating is crosslinked.

6. The air and water barrier article of claim 1, wherein the polymeric coating comprises a polyoxyalkylene polymer having at least one crosslink site derived from condensation of an alkoxy silane.

7. The air and water barrier article of claim 1, wherein the air and water barrier article passes Modified Test 1 of ASTM D-1970/D-1970M-13, Modified Test 2 of ASTM D-1970/D-1970M-13, or Modified Test 3 of ASTM D-1970/D-1970M-13.

8. The air and water barrier article of claim 1, wherein the adhesive is continuously disposed on the major surface of the polymer-coated inelastic porous layer.

9. The air and water barrier article of claim 1, wherein the inelastic porous layer comprises at least one of a nonwoven fabric, a woven fabric, or a knitted fabric.

10. The air and water barrier article of claim 1, wherein the inelastic porous layer comprises at least one of polyester, polylactic acid, surface-modified polyolefin, polyamide, or rayon.

11. The air and water barrier article of claim 1, further comprising with a liner disposed on a major surface of the air and water barrier article.

12. The air and water barrier article of claim 11, further comprising at least one second coating composition between a first major surface of the liner and the polymer-coated inelastic porous layer.

13. The air and water barrier article of claim 11, wherein a second major surface of the liner opposite from a first major surface of the liner comprises a release surface, and wherein the adhesive is in contact with the release surface when the air and water barrier article is wound into a roll.

14. A method of applying an air and water barrier article, the method comprising:
 adhering at least a portion of the adhesive on the roll of the air and water barrier article of claim 13 to the surface of the building component, so that the air and water barrier article is affixed to the surface of the building component;
 unwinding at least a portion of the roll, wherein during the unwinding, the liner remains disposed on the polymer-coated inelastic porous layer; and optionally
 removing the liner from the polymer-coated inelastic porous layer.

15. The air and water barrier article of claim 2, wherein the polymeric coating at least partially impregnates the inelastic porous layer.

16. The air and water barrier article of claim 2, wherein the polymeric coating is continuous.

17. The air and water barrier article of claim 2, wherein the polymeric coating is crosslinked.

18. The air and water barrier article of claim 2, wherein the polymeric coating comprises a polyoxyalkylene polymer having at least one crosslink site derived from condensation of an alkoxy silane.

19. The air and water barrier article of claim 2, wherein the inelastic porous layer comprises at least one of a non-woven fabric, a woven fabric, or a knitted fabric.

20. The air and water barrier article of claim 2, further comprising a liner disposed on a major surface of the air and water barrier article.

\* \* \* \* \*